United States Patent
Hahn et al.

(10) Patent No.: US 12,250,078 B2
(45) Date of Patent: Mar. 11, 2025

(54) METHOD AND APPARATUS FOR TRANSMITTING AND RECEIVING HARQ RESPONSE IN COMMUNICATION SYSTEM SUPPORTING SIDELINK COMMUNICATION

(71) Applicants: Hyundai Motor Company, Seoul (KR); Kia Corporation, Seoul (KR)

(72) Inventors: Gene Back Hahn, Gyeonggi-do (KR); Hyuk Min Son, Jeollabuk-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 395 days.

(21) Appl. No.: 17/635,169

(22) PCT Filed: Aug. 5, 2020

(86) PCT No.: PCT/KR2020/010318
§ 371 (c)(1),
(2) Date: Feb. 14, 2022

(87) PCT Pub. No.: WO2021/029596
PCT Pub. Date: Feb. 18, 2021

(65) Prior Publication Data
US 2022/0294570 A1      Sep. 15, 2022

Related U.S. Application Data

(60) Provisional application No. 62/886,673, filed on Aug. 14, 2019.

(30) Foreign Application Priority Data

Jul. 29, 2020   (KR) ..................... 10-2020-0094756

(51) Int. Cl.
*H04L 1/1812*   (2023.01)
*H04L 5/00*     (2006.01)
*H04W 72/20*    (2023.01)

(52) U.S. Cl.
CPC .......... *H04L 1/1812* (2013.01); *H04L 5/0048* (2013.01); *H04W 72/20* (2023.01)

(58) Field of Classification Search
CPC ... H04L 1/1812; H04L 5/0048; H04L 1/1861; H04L 1/1896; H04L 2001/0093;
(Continued)

(56) References Cited

U.S. PATENT DOCUMENTS

| | | |
|---|---|---|
| 8,867,430 B2 | 10/2014 | Chung et al. |
| 2019/0132104 A1 | 5/2019 | Lee et al. |

(Continued)

FOREIGN PATENT DOCUMENTS

| | | |
|---|---|---|
| KR | 2019-0008387 A | 1/2019 |
| WO | 2017-075798 A1 | 5/2017 |
| WO | 2018/004323 A1 | 1/2018 |

OTHER PUBLICATIONS

Nokia, "Discussion on Sidelink Groupcast HARQ", R1-1905340, 3GPP TSG RAN WG1 Meeting #96bis, Xi', China, Apr. 3, 2019.

(Continued)

*Primary Examiner* — Yu-Wen Chang
(74) *Attorney, Agent, or Firm* — Fox Rothschild LLP

(57) ABSTRACT

Disclosed are a method and apparatus for transmitting and receiving an HARQ response in a communication system supporting sidelink communication. An operating method for a transmitting terminal comprises the steps of: receiving, from a base station, a higher layer signaling message including PSFCH configuration information; transmitting, to a plurality of receiving terminals, SCI including resource allocation information of data and configuration information for HARQ feedback on the data; transmitting, to the plurality of receiving terminals, the data on a PSSCH indicated by the SCI; and receiving, from the plurality of receiving terminals, a sequence mapped to HARQ responses to the
(Continued)

data on a PSFCH indicated by the PSFCH configuration information. Therefore, the performance of the communication system can be improved.

19 Claims, 16 Drawing Sheets

(58) Field of Classification Search
CPC ... H04L 5/0044; H04L 5/0094; H04L 5/0055; H04L 1/1864; H04W 72/20; H04W 4/40; H04W 4/70; H04W 72/0446; H04W 72/0453; H04W 72/535
See application file for complete search history.

(56) References Cited

U.S. PATENT DOCUMENTS

| | | | |
|---|---|---|---|
| 2019/0174530 A1 | 6/2019 | Kim et al. | |
| 2020/0228247 A1* | 7/2020 | Guo | H04W 52/383 |
| 2020/0344722 A1* | 10/2020 | He | H04W 72/0446 |
| 2020/0351032 A1* | 11/2020 | Wu | H04W 72/56 |
| 2020/0351033 A1* | 11/2020 | Ryu | H04L 1/1861 |
| 2021/0028910 A1* | 1/2021 | Cheng | H04L 5/0064 |
| 2021/0167926 A1* | 6/2021 | Lin | H04W 76/14 |
| 2021/0336728 A1* | 10/2021 | Selvanesan | H04L 1/1896 |
| 2021/0391951 A1* | 12/2021 | Lee | H04W 4/08 |
| 2021/0400635 A1* | 12/2021 | Blasco Serrano | H04W 52/52 |
| 2022/0085923 A1* | 3/2022 | Ye | H04L 1/1825 |
| 2022/0201654 A1* | 6/2022 | Lee | H04L 1/1864 |
| 2022/0210768 A1* | 6/2022 | Zhou | H04W 4/40 |

OTHER PUBLICATIONS

"Discussion on Sidelink groupcast HARQ", Agenda Item: 7.2.4.8, 3GPP TSG-RAN WG1 Meeting #96bis, Xi'an, China, Apr. 8-12, 2019, Nokia, Nokia Shanghai Bell, R1-1905340, 9 pages.

"Sidelink physical layer procedures for NR V2X", Agenda Item: 7.2.4.5, 3GPP TSG RAN WG1 Meeting #97, Reno, USA, May 13-17, 2019, Huawei, HiSilicon, R1-1906008, 23 pages.

"Discussion on Sidelink groupcast HARQ", 3GPP TSG-RAN WG1 Meeting #96bis, Xi'an, China, Apr. 8-12, 2019, Agenda Item 7.2.4.8, 9 pages.

R1-1905480, "Physical layer procedures for sidelink", 3GPP TSG-RAN WG1 Meeting #96bis, Xi'an, China, Apr. 8-12, 2019, 13 pages.

R1-1906008, "Sidelink physical layer procedures for NR V2X", 3GPP TSG RAN WG1 Meeting #97, Reno, USA, May 13-17, 2019, 23 pages.

* cited by examiner

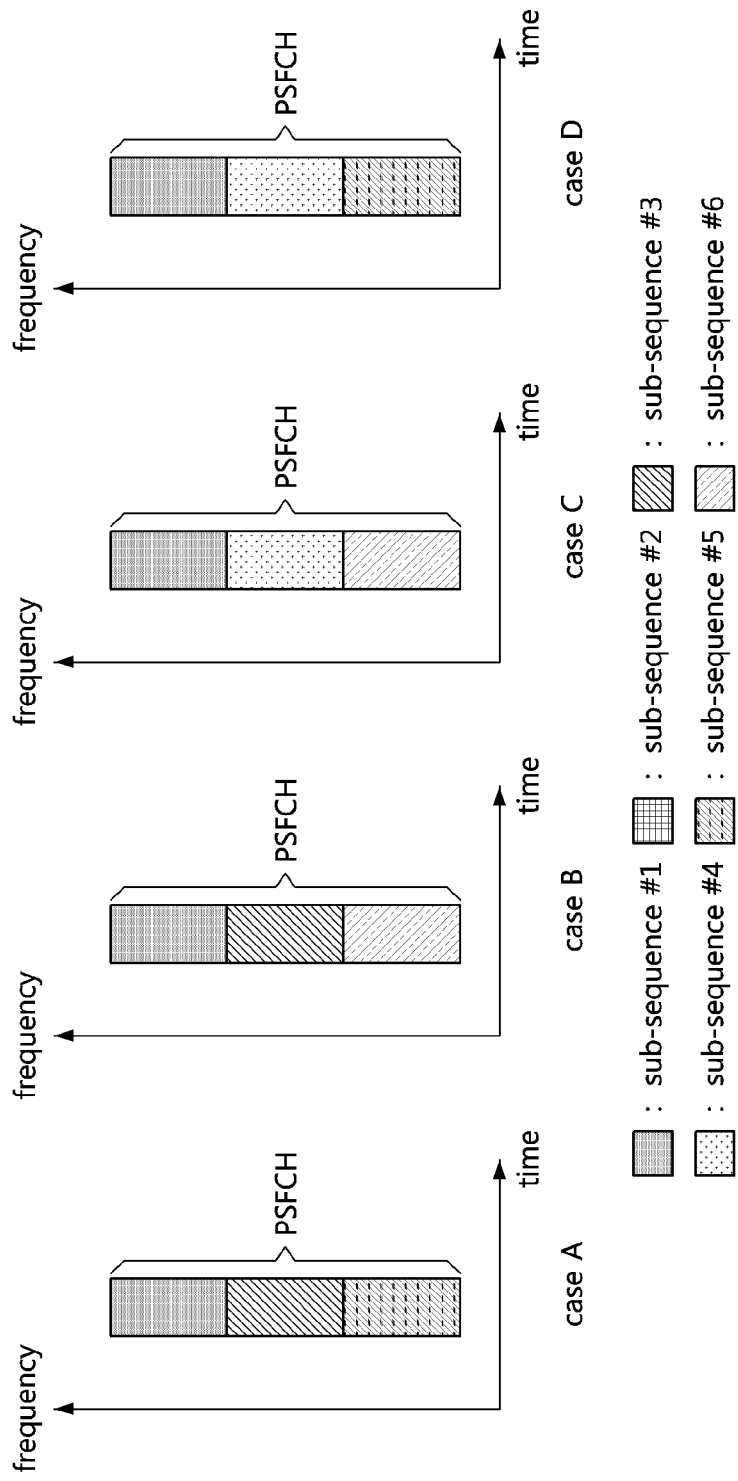

METHOD AND APPARATUS FOR TRANSMITTING AND RECEIVING HARQ RESPONSE IN COMMUNICATION SYSTEM SUPPORTING SIDELINK COMMUNICATION

CROSS-REFERENCE TO RELATED APPLICATIONS

This application is a National Phase application filed under 35 USC 371 of PCT International Application No. PCT/KR2020/010318 with an International Filing Date of Aug. 5, 2020, which claims the benefit of U.S. Provisional Application 62/886,673 filed on Aug. 14, 2019 and Korean Application 10-2020-0094756 filed on Jul. 29, 2020. The entire contents of these applications are incorporated herein by reference in their entirety.

BACKGROUND

(a) Technical Field

The present disclosure relates to a sidelink communication technique, more particularly, to a technique for transmitting and receiving a hybrid automatic repeat request (HARQ) response for sidelink communication performed in a groupcast scheme.

(b) Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2D communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, sidelink communication may be performed based on a unicast scheme, a multicast scheme, a groupcast scheme, and/or a broadcast scheme. In addition, a blind retransmission scheme may be supported for retransmission of sidelink data in sidelink communication, and a hybrid automatic repeat request (HARQ) operation may be supported. As a HARQ response (e.g., HARQ feedback) for sidelink data, acknowledgment (ACK) or negative ACK (NACK) may be transmitted.

In sidelink communication, a HARQ response may be transmitted in form of a sequence. For example, a receiving terminal may transmit a sequence corresponding to a HARQ response (e.g., ACK or NACK) to a transmitting terminal, and the transmitting terminal may identify the HARQ response corresponding to the sequence received from the receiving terminal. In addition, in sidelink-groupcast communication in which a plurality of receiving terminals participate, HARQ responses may be transmitted in form of sequences. In this case, a method for assigning sequences to the plurality of receiving terminals, a method for detecting a plurality of sequences, and the like may be required. Here, the transmitting terminal may be a terminal transmitting sidelink data, the receiving terminal may be a terminal receiving the sidelink data, and the sidelink-groupcast communication may be sidelink communication performed in a groupcast scheme.

SUMMARY

An objective of the present disclosure for solving the above-described problem is to provide a method and an apparatus for transmitting and receiving hybrid automatic repeat request (HARQ) responses in a communication system supporting sidelink communication.

An operation method of a transmitting terminal, according to a first exemplary embodiment of the present disclosure for achieving the objective, may comprise: receiving, from a base station, a higher layer signaling message including physical sidelink feedback channel (PSFCH) configuration information; transmitting, to a plurality of receiving terminals, sidelink control information (SCI) including resource allocation information of data and configuration information for hybrid automatic repeat request (HARQ) feedback for the data; transmitting, to the plurality of receiving terminals, the data on a physical sidelink shared channel (PSSCH) indicated by the SCI; and receiving, from the plurality of receiving terminals, one sequence mapped to HARQ responses for the data on a PSFCH indicated by the PSFCH configuration information, wherein the one sequence is configured with a first sub-sequence mapped to a first HARQ response of a first receiving terminal among the plurality of receiving terminals and a second sub-sequence mapped to a second HARQ response of a second receiving terminal among the plurality of receiving terminals.

The PSFCH configuration information may include an information element indicating a HARQ feedback scheme, and the HARQ feedback scheme may be an acknowledgement (ACK)/negative ACK (HACK) feedback scheme, an ACK-only feedback scheme, or a NACK-only feedback scheme.

The first sub-sequence may be detected in a first feedback resource region included in the PSFCH, the second sub-sequence may be detected in a second feedback resource region included in the PSFCH, and the first feedback resource region may be orthogonal to the second feedback resource region.

A sub-sequence set including the first sub-sequence and the second sub-sequence may be configured for each resource pool, and configuration information of the sub-sequence set may be included in the PSFCH configuration information.

The sub-sequence set may include a sub-sequence configured for each of a plurality of receiving terminals or a sub-sequence configured for each of ACK and NACK.

The operation method may further comprise receiving reference signals from the plurality of receiving terminals, wherein the receiving of the one sequence is performed according to channel estimation results based on the reference signals.

When a symbol in which the reference signals are located is same as a symbol in which the sequence is located, the reference signals may be multiplexed with the sequence in frequency domain.

The plurality of receiving terminals may be receiving terminals having a reception quality within a preset range or receiving terminals having a distance from the transmitting terminal within a threshold among all receiving terminals participating in the sidelink communication.

An operation method of a first receiving terminal, according to a second exemplary embodiment of the present disclosure for achieving the objective, may comprise: receiving, from a base station, a higher layer signaling message including physical sidelink feedback channel (PSFCH) configuration information; receiving, from a transmitting terminal, sidelink control information (SCI) including resource allocation information of data and configuration information for hybrid automatic repeat request (HARQ) feedback for the data; performing a monitoring operation on a physical sidelink shared channel (PSSCH) indicated by the SCI to receive the data from the transmitting terminal; and transmitting, to the transmitting terminal, a first sub-sequence mapped to a HARQ response for the data and a first reference signal used for detection of the first sub-sequence on a PSFCH indicated by the PSFCH configuration information.

When a symbol in which the first reference signal is located is same as a symbol in which the first sub-sequence is located, the first reference signal may be multiplexed with the first sub-sequence in frequency domain.

The first sub-sequence may be mapped to a first feedback resource region included in the PSFCH, and a second sub-sequence of a second receiving terminal may be mapped to a second feedback resource region included in the PSFCH.

The first reference signal and a second reference signal used for detection of the second sub-sequence may be multiplexed in same resource elements (REs).

A sub-sequence set including the first sub-sequence and the second sub-sequence may be configured for each resource pool, and configuration information of the sub-sequence set may be included in the PSFCH configuration information.

The PSFCH configuration information may include an information element indicating a HARQ feedback scheme, and the HARQ feedback scheme may be an acknowledgement (ACK)/negative ACK (HACK) feedback scheme, an ACK-only feedback scheme, or a NACK-only feedback scheme.

The SCI may further include a terminal group identifier indicating a plurality of receiving terminals participating in the sidelink communication, and the plurality of receiving terminals indicated by the terminal group identifier may have a reception quality within a preset range.

A transmitting terminal, according to a third exemplary embodiment of the present disclosure for achieving the objective, may comprise: a processor; and a memory storing one or more instructions executable by the processor, wherein the one or more instructions are executed to: transmit, to a plurality of receiving terminals, data on a physical sidelink shared channel (PSSCH); receive reference signals from the plurality of receiving terminals; estimate channel states between the transmitting terminal and the plurality of receiving terminals based on the reference signals; and detect sub-sequences mapped to hybrid automatic repeat request (HARQ) responses for the data based on the estimated channel states.

The one or more instructions may be further executed to receive, from a base station, a higher layer signaling message including physical sidelink feedback channel (PSFCH) configuration information, the PSFCH configuration information may include an information element indicating a HARQ feedback scheme, and the HARQ feedback scheme may be an acknowledgement (ACK)/negative ACK (HACK) feedback scheme, an ACK-only feedback scheme, or a NACK-only feedback scheme.

The one or more instructions may be further executed to transmit, to the plurality of receiving terminals, sidelink control information (SCI) including resource allocation information of the PSSCH, the SCI may further include a terminal group identifier indicating the plurality of receiving terminals participating in the sidelink communication, and the plurality of receiving terminals indicated by the terminal group identifier may have a reception quality within a preset range.

The reference signals and the sub-sequences may be received on a PSFCH.

When the plurality of receiving terminals include a first receiving terminal and a second receiving terminal, the sub-sequences may include a first sub-sequence of the first receiving terminal and a second sub-sequence of the second receiving terminal, and the first sub-sequence and the second sub-sequence may be mapped to different feedback resource regions included in a PSFCH.

The reference signals may include a first reference signal used for detection of the first sub-sequence and a second reference signal used for detection of the second sub-sequence, and the first reference signal and the second reference signal may be multiplexed in same resource elements (REs).

According to the present disclosure, sub-sequences mapped to HARQ responses may be configured. Receiving terminals may transmit sub-sequences corresponding to HARQ responses for received data to a transmitting terminal. A combination of sub-sequences may become one sequence. The transmitting terminal may receive the one sequence from the receiving terminals, may detect the sub-sequences constituting the one sequence, and may identify the HARQ responses (e.g., ACK or NACK) of the respective receiving terminals by using the detected sub-sequences. Accordingly, the sidelink communication can be efficiently performed, and the performance of the communication system can be improved.

BRIEF DESCRIPTION OF DRAWINGS

FIGS. 11A and 11B are conceptual diagrams illustrating a first exemplary embodiment of a method for transmitting and receiving HARQ responses using sub-sequences defined in Table 7 in a communication system supporting sidelink communication.

DETAILED DESCRIPTION

Figure 1:
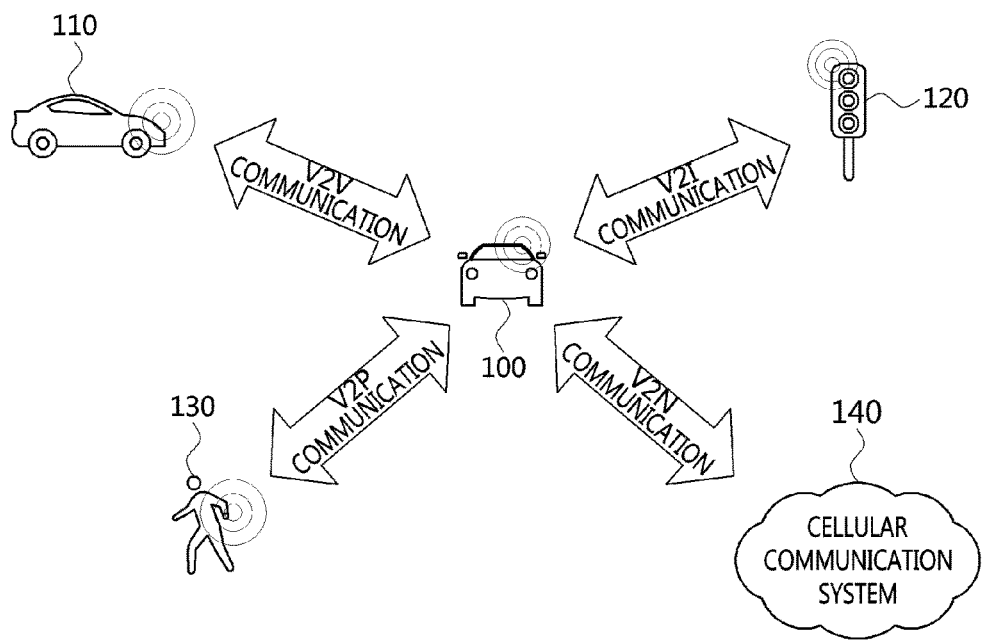
FIG. 1 is a conceptual diagram illustrating V2X communication scenarios.

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
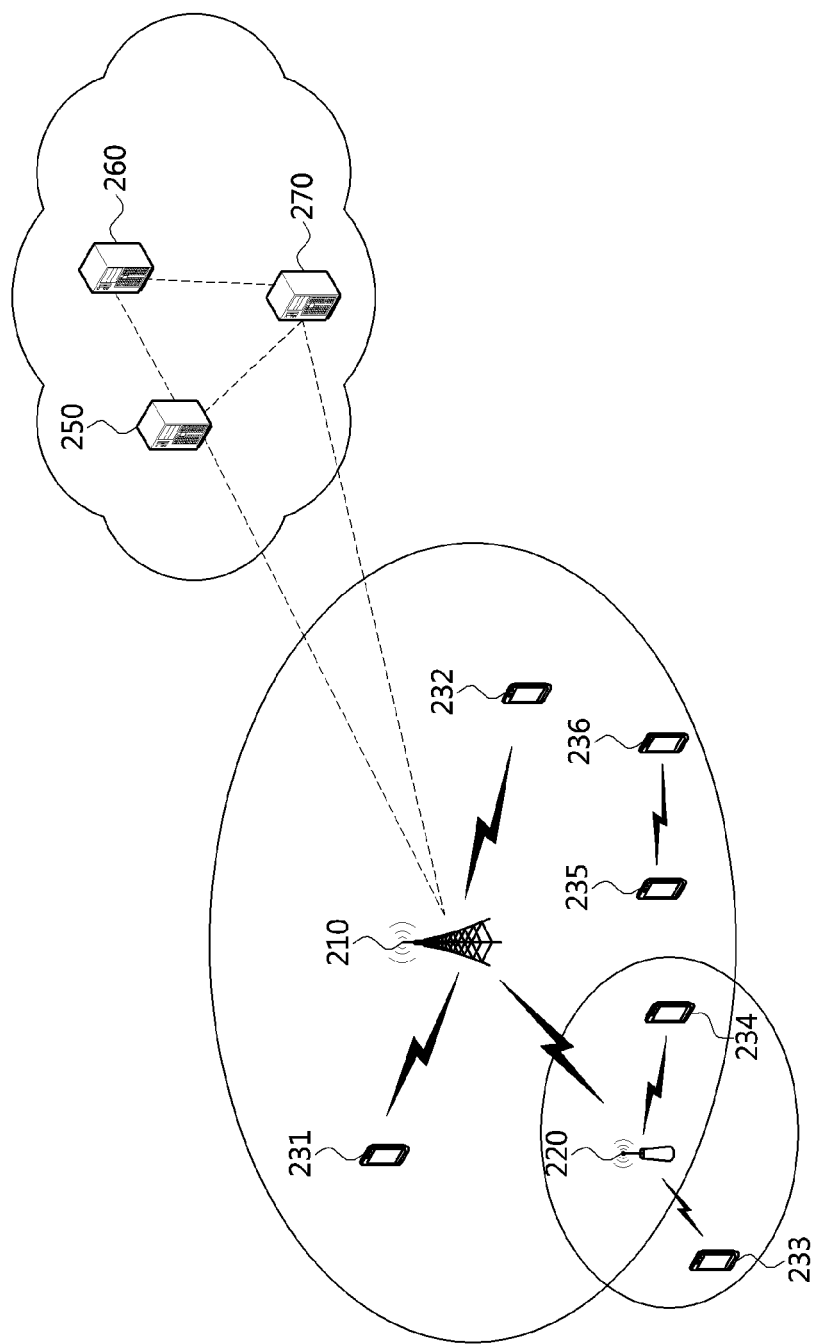
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like.

The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
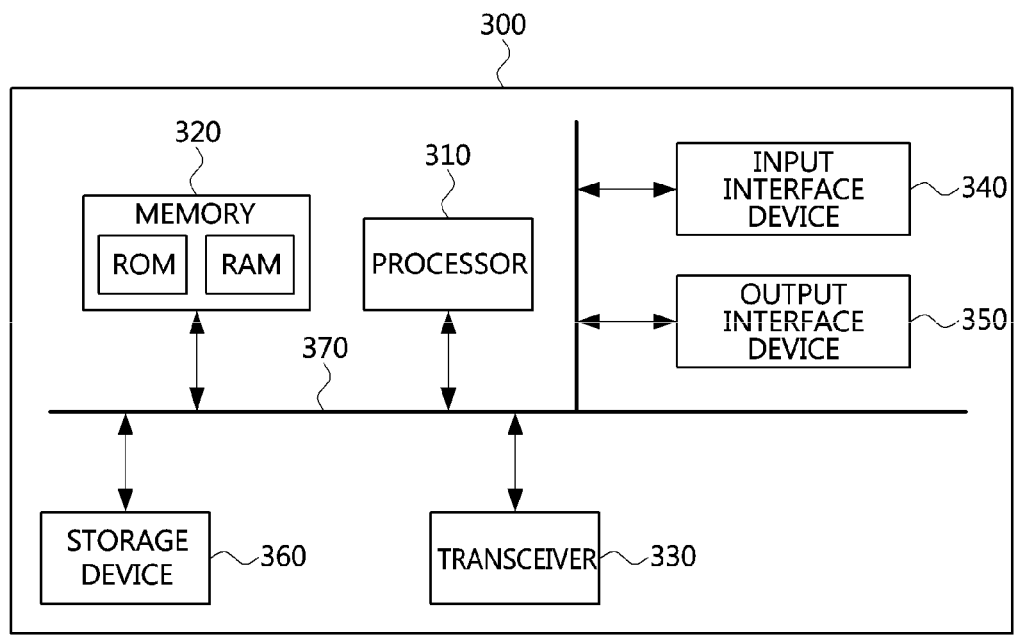
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
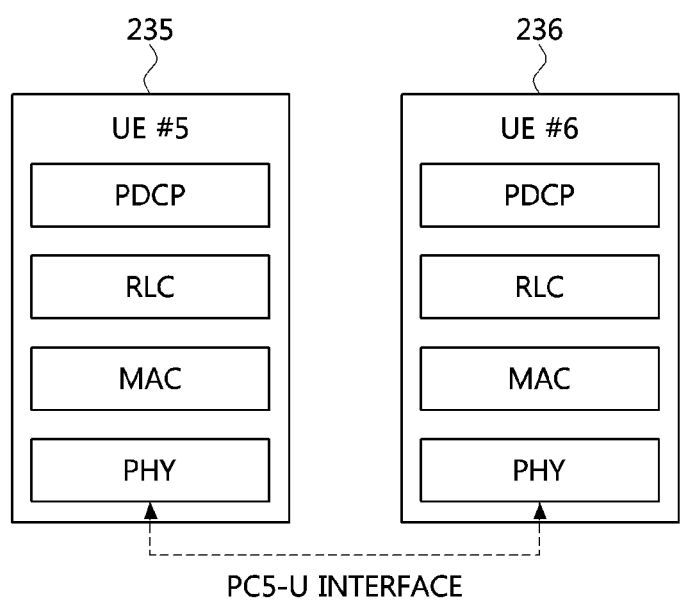
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
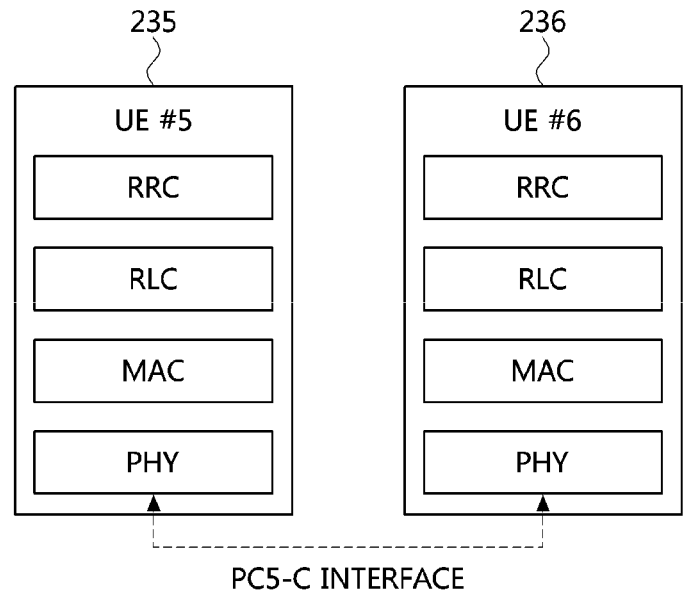
FIG. 5 is a block diagram illustrating a first exemplary embodiment of a control plane protocol stack of a UE performing sidelink communication.
Figure 6:
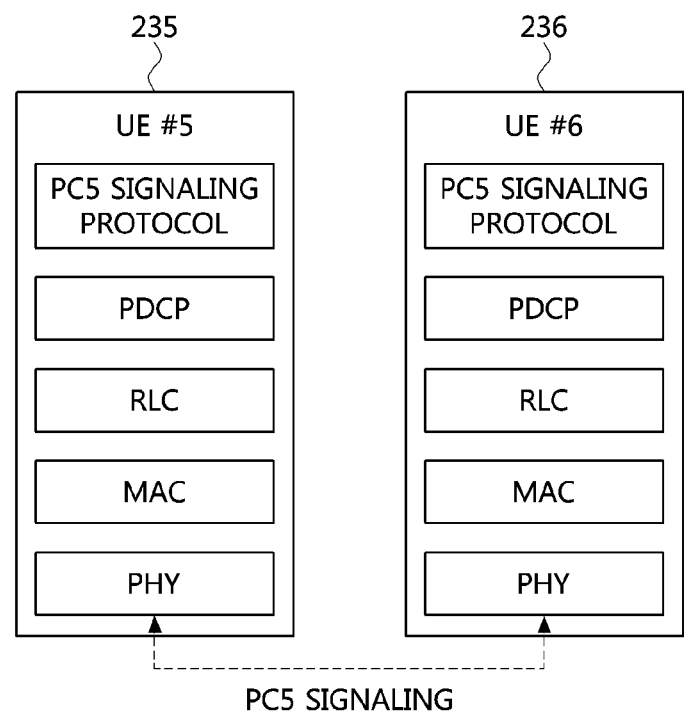
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for transmitting and receiving HARQ responses in sidelink communication will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, a HARQ response may indicate acknowledgment (ACK), negative ACK (NACK), and/or discontinuous transmission (DTX). The exemplary embodiment applied to the case where a HARQ response indicates ACK may also be applied to the case where a HARQ response indicates NACK or DTX. The exemplary embodiment applied to the case where a HARQ response indicates NACK may also be applied to the case where a HARQ response indicates ACK or DTX. The exemplary embodiment applied to the case where a HARQ response indicates DTX may also be applied to the case where a HARQ response indicates ACK or NACK.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

In sidelink communication (e.g., sidelink communication for V2X communication), a HARQ feedback operation may be supported. A HARQ feedback operation for sidelink-groupcast communication may be performed in two schemes. The sidelink-groupcast communication may mean sidelink communication performed in a groupcast scheme. In the first scheme, all receiving terminals participating in sidelink-groupcast communication (e.g., terminals receiving sidelink data) may share a PSFCH resource region (e.g., PSFCH resource pool), and may transmit only NACK to a transmitting terminal (e.g., terminal transmitting the sidelink data) by using the PSFCH resource region.

In this case, the receiving terminal may not transmit ACK to the transmitting terminal when the sidelink data has been successfully received, and may transmit NACK to the transmitting terminal when the reception of the sidelink data has failed. This scheme may be referred to as a 'NACK-only feedback scheme'. In exemplary embodiments, "data, information, and/or signal is successfully received" may mean that "decoding of the data, information, and/or signal is successful". "reception of data, information, and/or signal fails" may mean "decoding of the data, information, and/or signal fails".

In the second scheme, a PSFCH resource region may be independently allocated (e.g., configured) to each of the receiving terminals, and each receiving terminal may transmit a HARQ response (e.g., ACK, NACK, or DTX) to the transmitting terminal by using the allocated PSFCH resource region (e.g., dedicated PSFCH resource region). In addition, for transmission of HARQ responses, a combination of the first and second scheme described above may be used. Here, a PSFCH may be in form of a sequence.

Figure 7:
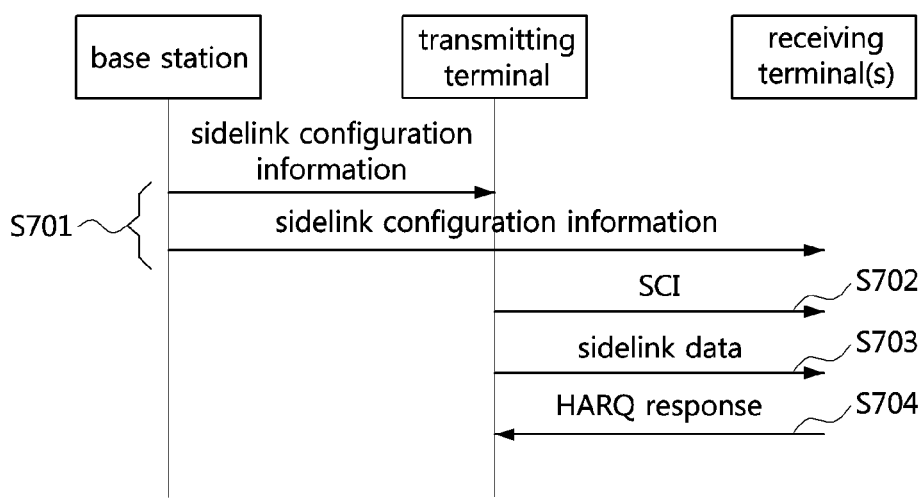
FIG. 7 is a sequence chart illustrating a first exemplary embodiment of a method for transmitting and receiving HARQ responses in a communication system supporting sidelink communication.

FIG. 7 is a sequence chart illustrating a first exemplary embodiment of a method for transmitting and receiving HARQ responses in a communication system supporting sidelink communication.

As shown in FIG. 7, a communication system may include a base station, a transmitting terminal, and receiving terminal(s). The transmitting terminal may be a terminal transmitting sidelink data (e.g., PSSCH), and the receiving terminal(s) may be a terminal receiving the sidelink data. The base station may be the base station 210 shown in FIG. 2. The transmitting terminal may be the UE 235 shown in FIG. 2, and the receiving terminal(s) may be the UE 236 shown in FIG. 2. Alternatively, the transmitting terminal may be the UE 236 shown in FIG. 2, and the receiving terminal(s) may be the UE 235 shown in FIG. 2. Each of the transmitting terminal and the receiving terminal(s) may be located in a corresponding vehicle. The base station, transmitting terminal, and receiving terminal(s) may be configured identically or similarly to the communication node 300 shown in FIG. 3. The transmitting terminal and receiving terminal(s) may support the protocol stacks shown in FIGS. 4 to 6. The transmitting terminal and receiving terminal(s) may be connected to the base station, and may perform sidelink communication based on scheduling of the base station. Alternatively, the transmitting terminal and receiving terminal(s) may be located outside coverage of the base station, and may perform sidelink communication without scheduling of the base station.

The base station may generate sidelink configuration information and transmit the sidelink configuration information through higher layer signaling (S701). The terminals (e.g., transmitting terminal and receiving terminal(s)) may receive the sidelink configuration information from the base station, and may perform sidelink communication based on the sidelink configuration information. Here, the transmitting terminal and the receiving terminal(s) may perform sidelink-groupcast communication.

The transmitting terminal may generate SCI including scheduling information (e.g., resource allocation information) of sidelink data (e.g., PSSCH), and may transmit the SCI to the receiving terminal(s) (S702). The SCI may include a'1st-stage SCI', or both a'1st-stage SCI' and a '2nd-stage SCI'. The SCI (e.g., 1st-stage SCI) may be transmitted on a PSCCH, and the 2nd-stage SCI may be transmitted on a PSSCH. The SCI may be a common SCI transmitted to all receiving terminals participating in sidelink-groupcast communication. Alternatively, the SCI may be a dedicated SCI transmitted to each of the receiving terminals participating in sidelink-groupcast communication.

The 1st-stage SCI may include at least one information element among priority information, frequency resource assignment information, time resource assignment information, resource reservation period information, DMRS pattern information, 2nd-stage SCI format information, beta offset indicator, the number of DMRS ports, modulation and coding scheme (MCS) information, and combinations thereof. The 2nd-stage SCI may include at least one information element among a HARQ processor identifier (ID), redundancy version (RV), source ID, destination ID, CSI request information, zone ID, communication range requirements, and combinations thereof. In addition, the SCI (e.g., 1st-stage SCI and/or 2nd-stage SCI) may further include information indicating a PSFCH resource for HARQ feedback (e.g., frequency resource assignment information, time resource assignment information) and/or information for transmitting a HARQ feedback.

The receiving terminal(s) may receive the SCI (e.g., 1st-stage SCI and/or 2nd-stage SCI) from the transmitting terminal, and may identify information elements (e.g., PSSCH resource information, PSFCH resource information, etc.) included in the SCI. The transmitting terminal may transmit sidelink data to the receiving terminal(s) on a PSSCH indicated by the SCI (S703). The receiving terminal(s) may receive the sidelink data from the transmitting terminal by performing a monitoring operation on the PSSCH.

Each of the receiving terminal(s) may transmit, to the transmitting terminal, a HARQ response for the sidelink data on a PSFCH indicated by the SCI (S704). Alternatively, the PSFCH may be configured by higher layer signaling. If decoding of the sidelink data is successful, ACK for the sidelink data may be transmitted in the step S704. If decoding of the sidelink data fails, NACK for the sidelink data may be transmitted in the step S704. The above scheme may be referred to as the 'ACK/NACK feedback scheme'.

Alternatively, the NACK-only feedback scheme may be used. In this case, if decoding of the sidelink data is successful, ACK for the sidelink data may not be transmitted in the step S704. If decoding of the sidelink data fails, NACK for the sidelink data may be transmitted in the step S704. That is, only NACK may be transmitted as a HARQ response. Alternatively, an ACK-only feedback scheme may be used. In this case, if decoding of the sidelink data is successful, ACK for the sidelink data may be transmitted in the step S704. If decoding of the sidelink data fails, NACK for the sidelink data may not be transmitted in the step S704. That is, only ACK may be transmitted as a HARQ response.

The transmitting terminal may receive the HARQ response(s) from the receiving terminal(s) by performing a monitoring operation on the PSFCH. The ACK/NACK feedback scheme may be used. In this case, when the HARQ response indicates ACK(s), the transmitting terminal may determine that the sidelink data has been successfully received at the receiving terminal(s). When the HARQ response indicates NACK, the transmitting terminal may determine that reception of the sidelink data has failed at the receiving terminal(s).

Alternatively, the NACK-only feedback scheme may be used. In this case, if a HARQ response is not received, the transmitting terminal may determine that the sidelink data has been successfully received at the receiving terminal(s). If NACK is received, the transmitting terminal may determine that reception of the sidelink data at the receiving terminal(s) has failed. When it is determined that the receiving terminal(s) has failed to receive the sidelink data, the transmitting terminal may perform a retransmission procedure for the sidelink data.

Alternatively, the ACK-only feedback scheme may be used. In this case, when ACK is received, the transmitting terminal may determine that the sidelink data has been successfully received at the receiving terminal(s). If the HARQ response (e.g., ACK) is not received, the transmitting terminal may determine that reception of the sidelink data has failed in the receiving terminal(s). When it is determined that the receiving terminal(s) has failed to receive the sidelink data, the transmitting terminal may perform a retransmission procedure for the sidelink data.

Meanwhile, methods for transmitting and receiving sequence-based HARQ responses will be described in exemplary embodiments below. A sequence mapped to a HARQ response may be configured (e.g., assigned), the receiving terminal may transmit the sequence mapped to the HARQ response, and the transmitting terminal may identify the HARQ response mapped to the sequence received from the receiving terminal. The sequence mapped to the HARQ response may be transmitted/received on a PSFCH. PSFCH configuration information (e.g., resource allocation information) and/or sequence-based HARQ response configuration information (e.g., sequence configuration information) may be transmitted through one or a combination of two or more of higher layer signaling, MAC signaling, and PHY signaling.

One PSFCH (e.g., one PSFCH resource region) may be configured for transmission of HARQ response(s) of the receiving terminal(s). The maximum number of receiving terminals supportable in one PSFCH may be limited. Here, the maximum number of receiving terminals may be set by one or a combination of two or more of higher layer signaling, MAC signaling, and PHY signaling. When the number of receiving terminals participating in sidelink-groupcast communication is greater than the maximum number of receiving terminals supportable in one PSFCH, a plurality of PSFCHs may be used. For example, among a plurality of receiving terminals participating in sidelink-groupcast communication, some terminals may transmit HARQ response(s) (e.g., sequence(s) mapped to the HARQ response(s)) using a PSFCH #1, and the remaining terminals may transmit HARQ response(s) (e.g., sequence(s) mapped to the HARQ response(s)) using a PSFCH #2. Each of the plurality of PSFCHs may include feedback resource region(s) to which a sequence corresponding to a HARQ response is mapped. The PSFCH configuration information may include configuration information of feedback resource region(s) included in the PSFCH.

[Sequence-Based HARQ Response Transmission/Reception Method]

A plurality of receiving terminals may transmit HARQ responses (e.g., sequences mapped to the HARQ responses) by using the same PSFCH (e.g., the same time-frequency resources). When a plurality of receiving terminals (e.g., receiving terminals #1 and #2) participate in sidelink communication (e.g., sidelink-groupcast communication), and the ACK/NACK feedback scheme is used, sub-sequences assigned (e.g., configured) respectively to the receiving terminals #1 and #2 may be defined as shown in Table 3 below. The sub-sequences #1 to #4 may be orthogonal to each other. That is, the sub-sequences #1 to #4 may be orthogonal sequences. Alternatively, at least two sub-sequences among the sub-sequences #1 to #4 may be orthogonal to each other.

TABLE 3

| | Sequence | |
|---|---|---|
| Receiving terminal | ACK | NACK |
| Receiving terminal #1 | Sub-sequence #1 | Sub-sequence #4 |
| Receiving terminal #2 | Sub-sequence #2 | Sub-sequence #3 |

The receiving terminals #1 and #2 may transmit the sub-sequences mapped to the HARQ responses to the transmitting terminal on the same PSFCH. One sequence may be configured as a combination of one sub-sequence (e.g., sub-sequence #1 or sub-sequence #4) transmitted by the receiving terminal #1 and one sub-sequence (e.g., sub-sequence #2 or sub-sequence #3) transmitted by the receiving terminal #2. A sequence configured as a combination of a plurality of sub-sequences may be referred to as a long sequence or a full sequence. The sub-sequences defined in Table 3 may be transmitted as follows.

Figure 8:
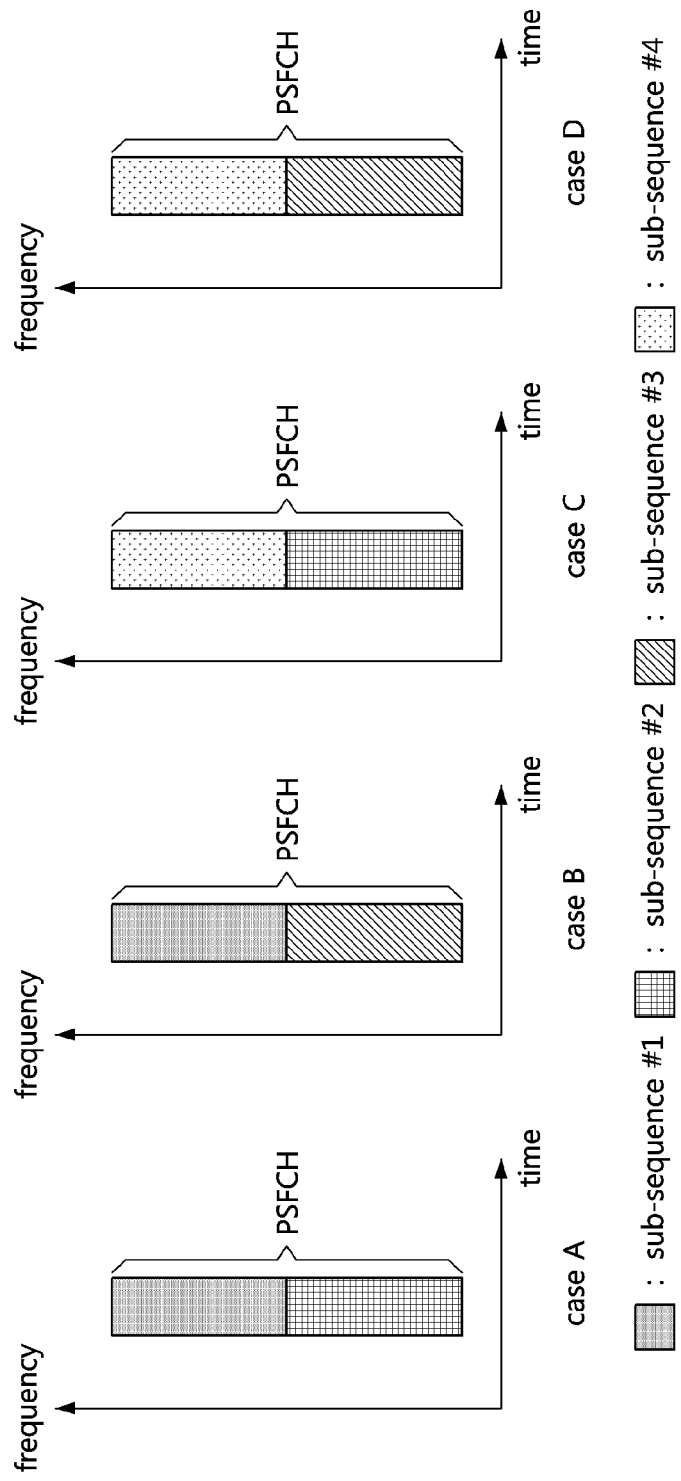
FIG. 8 is a conceptual diagram illustrating a first exemplary embodiment of a method for transmitting and receiving HARQ responses using sub-sequences defined in Table 3 in a communication system supporting sidelink communication.

FIG. 8 is a conceptual diagram illustrating a first exemplary embodiment of a method for transmitting and receiving HARQ responses using sub-sequences defined in Table 3 in a communication system supporting sidelink communication.

As shown in FIG. 8, a PSFCH may be configured with one or more symbols in the time domain and one or more resource blocks (RBs) in the frequency domain. The PSFCH may include feedback resource regions #1 and #2. The feedback resource region #1 may be multiplexed with the feedback resource region #2 in one or more domains among the frequency domain and the time domain. Each of the feedback resource regions #1 and #2 may be configured with consecutive resources (e.g., consecutive resource elements (REs)) or non-consecutive resources. The feedback resource region #1 may be used for transmission of the sub-sequence (e.g., HARQ response) of the receiving terminal #1, and the feedback resource region #2 may be used for transmission of the sub-sequence (e.g., HARQ response) of the receiving terminal #2. Alternatively, the sub-sequence of the receiving terminal #1 and the sub-sequence of the receiving terminal #2 may be transmitted in the same feedback resource region.

Each of the receiving terminals #1 and #2 may map the corresponding sub-sequence to consecutive or non-consecutive physical resources (e.g., physical resource elements (PREs)). Alternatively, each of the receiving terminals #1 and #2 may map the corresponding sub-sequence to consecutive or non-consecutive virtual resources (e.g., virtual resource elements (VREs)), and may map the virtual resources to physical resources according to a preconfigured mapping relationship. Here, the physical resources may mean the PSFCH (e.g., feedback resource region).

In a case A, the receiving terminal #1 may successfully receive data (e.g., sidelink data, sidelink-shared channel (SL-SCH)) from the transmitting terminal, and may transmit the sub-sequence #1 mapped to ACK for the data on the PSFCH (e.g., feedback resource region #1). The receiving terminal #2 may successfully receive the data from the transmitting terminal, and may transmit the sub-sequence #2 mapped to ACK for data on the PSFCH (e.g., feedback resource region #2). Here, one sequence may be configured with the sub-sequence #1 and the sub-sequence #2.

The transmitting terminal may detect the one sequence by performing a monitoring operation on the PSFCH, and may identify the sub-sequences #1 and #2 included in the one sequence. Here, the transmitting terminal may know the sub-sequence(s) assigned to each of the receiving terminals #1 and #2, and may know the feedback resource region used by each of the receiving terminals #1 and #2. When the sub-sequences #1 and #2 are detected, the transmitting terminal may determine that decoding of the data is successful in both the receiving terminals #1 and #2.

In a case B, the receiving terminal #1 may successfully receive data from the transmitting terminal, and may transmit the sub-sequence #1 mapped to ACK for the data on the PSFCH (e.g., feedback resource region #1). The receiving terminal #2 may not receive the data from the transmitting terminal, and may transmit the sub-sequence #3 mapped to NACK for the data on the PSFCH (e.g., feedback resource region #2). Here, one sequence may be configured with the sub-sequence #1 and the sub-sequence #3.

The transmitting terminal may detect the one sequence by performing a monitoring operation on the PSFCH, and may identify the sub-sequences #1 and #3 included in the one sequence. Here, the transmitting terminal may know the sub-sequence(s) assigned to each of the receiving terminals #1 and #2, and may know the feedback resource region used by each of the receiving terminals #1 and #2. When the sub-sequences #1 and #3 are detected, the transmitting terminal may determine that decoding of the data in the receiving terminal #1 is successful, and may determine that decoding of the data in the receiving terminal #2 has failed.

In a case C, the receiving terminal #1 may not receive data from the transmitting terminal, and may transmit the sub-sequence #4 mapped to NACK for the data on the PSFCH (e.g., feedback resource region #1). The receiving terminal #2 may successfully receive the data from the transmitting terminal, and may transmit the sub-sequence #2 mapped to ACK for the data on the PSFCH (e.g., feedback resource region #2). Here, one sequence may be configured with the sub-sequence #4 and the sub-sequence #2.

The transmitting terminal may detect the one sequence by performing a monitoring operation on the PSFCH, and may identify the sub-sequences #4 and #2 included in the one sequence. Here, the transmitting terminal may know the sub-sequence(s) assigned to each of the receiving terminals #1 and #2, and may know the feedback resource region used by each of the receiving terminals #1 and #2. When the sub-sequences #4 and #2 are detected, the transmitting terminal may determine that decoding of the data in the receiving terminal #1 has failed, and may determine that decoding of the data in the receiving terminal #2 is successful.

In a case D, the receiving terminal #1 may not receive data from the transmitting terminal, and may transmit the sub-sequence #4 mapped to NACK for the data on the PSFCH (e.g., feedback resource region #1). The receiving terminal #2 may not receive the data from the transmitting terminal, and may transmit the sub-sequence #3 mapped to NACK for the data on the PSFCH (e.g., feedback resource region #2). Here, one sequence may be configured with the sub-sequence #4 and the sub-sequence #3.

The transmitting terminal may detect the one sequence by performing a monitoring operation on the PSFCH, and may identify the sub-sequences #4 and #3 included in the one sequence. Here, the transmitting terminal may know the sub-sequence(s) assigned to each of the receiving terminals #1 and #2, and may know the feedback resource region used by each of the receiving terminals #1 and #2. When the sub-sequences #4 and #3 are detected, the transmitting terminal may determine that decoding of the data in both the receiving terminals #1 and #2 has failed.

On the other hand, when a plurality of receiving terminals (e.g., receiving terminals #1 and #2) participate in sidelink communication (e.g., sidelink-groupcast communication) and the ACK-only feedback scheme is used, sub-sequences assigned (e.g., configured) respectively to the receiving terminals #1 and #2 may be defined as shown in Table 4 below. The sub-sequences #1 and #2 may be orthogonal sequences. Alternatively, the sub-sequences #1 and #2 may not be orthogonal to each other.

TABLE 4

| Receiving terminal | Sequence | |
| --- | --- | --- |
| | ACK | NACK |
| Receiving terminal #1 | Sub-sequence #1 | — |
| Receiving terminal #2 | Sub-sequence #2 | — |

Alternatively, when a plurality of receiving terminals (e.g., receiving terminals #1 and #2) participate in sidelink communication (e.g., sidelink-groupcast communication) and the NACK-only feedback scheme is used, sub-sequences assigned (e.g., configured) respectively to the receiving terminals #1 and #2 may be defined as shown in Table 5 below. The sub-sequences #1 and #2 may be orthogonal sequences. Alternatively, the sub-sequences #1 and #2 may not be orthogonal to each other.

TABLE 5

| Receiving terminal | Sequence | |
|---|---|---|
| | ACK | NACK |
| Receiving terminal #1 | — | Sub-sequence #1 |
| Receiving terminal #2 | — | Sub-sequence #2 |

When the sub-sequences defined in Table 4 or 5 are used, the receiving terminals #1 and #2 may transmit the sub-sequences mapped to the HARQ responses to the transmitting terminal on the same PSFCH. One sequence (e.g., long sequence or full sequence) may be configured as a combination of one or two sub-sequences among one sub-sequence (e.g., sub-sequence #1) transmitted by the receiving terminal #1 and one sub-sequence (e.g., sub-sequence #2) transmitted by the receiving terminal #2. Alternatively, one sequence may not include any sub-sequences. The sub-sequences defined in Table 4 or Table 5 may be transmitted as follows.

Figure 9:
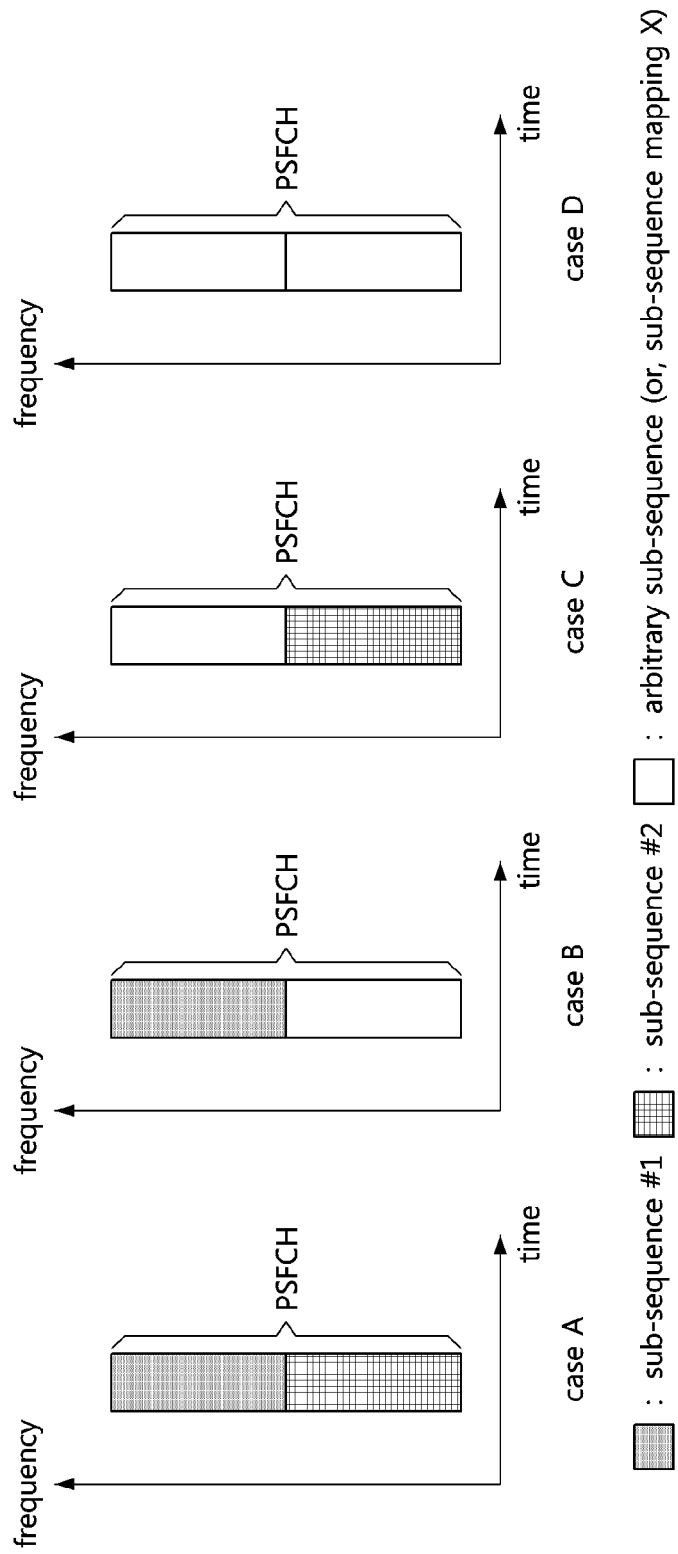
FIG. 9 is a conceptual diagram illustrating a first exemplary embodiment of a method for transmitting and receiving HARQ responses using sub-sequences defined in Table 4 or Table 5 in a communication system supporting sidelink communication.

FIG. 9 is a conceptual diagram illustrating a first exemplary embodiment of a method for transmitting and receiving HARQ responses using sub-sequences defined in Table 4 or Table 5 in a communication system supporting sidelink communication.

As shown in FIG. 9, a PSFCH may be configured with one or more symbols in the time domain and one or more RBs in the frequency domain. The PSFCH may include feedback resource regions #1 and #2. The feedback resource region #1 may be multiplexed with the feedback resource region #2 in one or more domains among the frequency domain and the time domain. Each of the feedback resource regions #1 and #2 may be configured with consecutive resources (e.g., consecutive REs) or non-consecutive resources. The feedback resource region #1 may be used for transmission of the sub-sequence (e.g., HARQ response) of the receiving terminal #1, and the feedback resource region #2 may be used for transmission of the sub-sequence (e.g., HARQ response) of the receiving terminal #2.

Each of the receiving terminals #1 and #2 may map the corresponding sub-sequence to consecutive or non-consecutive physical resources. Alternatively, each of the receiving terminals #1 and #2 may map the corresponding sub-sequence to consecutive or non-consecutive virtual resources, and may map the virtual resources to physical resources according to a preconfigured mapping relationship. Here, the physical resources may mean the PSFCH (e.g., feedback resource region).

ACK-Only Feedback Scheme

In a case A when the ACK-only feedback scheme is used, the receiving terminal #1 that has successfully received data may transmit the sub-sequence #1 mapped to ACK for the data on the PSFCH (e.g., feedback resource region #1). The receiving terminal #2 that has successfully received the data may transmit the sub-sequence #2 mapped to ACK for the data on the PSFCH (e.g., feedback resource region #2). Here, one sequence may be configured with the sub-sequence #1 and the sub-sequence #2.

The transmitting terminal may detect the one sequence by performing a monitoring operation on the PSFCH, and may identify the sub-sequences #1 and #2 included in the one sequence. Here, the transmitting terminal may know the sub-sequence(s) assigned to each of the receiving terminals #1 and #2, and may know the feedback resource region used by each of the receiving terminals #1 and #2. When the sub-sequences #1 and #2 are detected, the transmitting terminal may determine that decoding of the data is successful in both the receiving terminals #1 and #2.

In a case B when the ACK-only feedback scheme is used, the receiving terminal #1 that has successfully received data may transmit the sub-sequence #1 mapped to ACK for the data on the PSFCH (e.g., feedback resource region #1). The receiving terminal #2 that has not received the data may not transmit a HARQ response (e.g., NACK) for the data. Alternatively, when decoding of the data fails, the receiving terminal #2 may map an arbitrary sub-sequence (e.g., sub-sequence configured with '0's) to the feedback resource region #2.

The transmitting terminal may detect one sequence by performing a monitoring operation on the PSFCH, and may identify the sub-sequence #1 included in the one sequence. That is, the one sub-sequence #1 may be detected in the PSFCH. In this case, the transmitting terminal may determine that decoding of the data in the receiving terminal #1 is successful, and may determine that decoding of the data in the receiving terminal #2 has failed.

In a case C when the ACK-only feedback scheme is used, the receiving terminal #1 that has not received data may not transmit a HARQ response (e.g., NACK) for the data. Alternatively, when decoding of the data fails, the receiving terminal #1 may map an arbitrary sub-sequence (e.g., sub-sequence configured with '0's) to the feedback resource region #1. The receiving terminal #2 that has successfully received the data may transmit the sub-sequence #2 mapped to ACK for the data on the PSFCH (e.g., feedback resource region #2).

The transmitting terminal may detect one sequence by performing a monitoring operation on the PSFCH, and may identify the sub-sequence #2 included in the one sequence. That is, the one sub-sequence #2 may be detected in the PSFCH. In this case, the transmitting terminal may determine that decoding of the data in the receiving terminal #1 has failed, and may determine that decoding of the data in the receiving terminal #2 is successful.

In a case D when the ACK-only feedback scheme is used, the receiving terminal #1 that has not received data may not transmit a HARQ response (e.g., NACK) for the data. Alternatively, when decoding of the data fails, the receiving terminal #1 may map an arbitrary sub-sequence (e.g., sub-sequence configured with '0's) to the feedback resource region #1. The receiving terminal #2 that has not received the data may not transmit a HARQ response (e.g., NACK) for the data. Alternatively, when decoding of the data fails, the receiving terminal #2 may map an arbitrary sub-sequence (e.g., sub-sequence configured with '0's) to the feedback resource region #2.

The transmitting terminal may perform a monitoring operation on the PSFCH to detect the sub-sequence(s). When the sub-sequence(s) is not detected or when the sub-sequence(s) configured with '0's is detected, the transmitting terminal may determine that decoding of the data in both the receiving terminals #1 and #2 has failed.

NACK-Only Feedback Scheme

In a case A when the NACK-only feedback scheme is used, the receiving terminal #1 that has not received data may transmit the sub-sequence #1 mapped to NACK for the data on the PSFCH (e.g., feedback resource region #1). The receiving terminal #2 that has not received the data may transmit the sub-sequence #2 mapped to NACK for the data on the PSFCH (e.g., feedback resource region #2). Here, one sequence may be configured with the sub-sequence #1 and the sub-sequence #2.

The transmitting terminal may detect the one sequence by performing a monitoring operation on the PSFCH, and may identify the sub-sequences #1 and #2 included in the one sequence. Here, the transmitting terminal may know the sub-sequence(s) assigned to each of the receiving terminals #1 and #2, and may know the feedback resource region used by each of the receiving terminals #1 and #2. When the sub-sequences #1 and #2 are detected, the transmitting terminal may determine that decoding of the data in both the receiving terminals #1 and #2 has failed.

In a case B when the NACK-only feedback scheme is used, the receiving terminal #1 that has not received data may transmit the sub-sequence #1 mapped to NACK for the data on the PSFCH (e.g., feedback resource region #1). The receiving terminal #2 that has successfully received the data may not transmit a HARQ response (e.g., ACK) for the data. Alternatively, when decoding of the data is successful, the receiving terminal #2 may map an arbitrary sub-sequence (e.g., sub-sequence configured with '0's) to the feedback resource region #2.

The transmitting terminal may detect one sequence by performing a monitoring operation on the PSFCH, and may identify the sub-sequence #1 included in the one sequence. That is, the one sub-sequence #1 may be detected in the PSFCH. In this case, the transmitting terminal may determine that decoding of the data in the receiving terminal #1 has failed, and may determine that decoding of the data in the receiving terminal #2 is successful.

In a case C when the NACK-only feedback scheme is used, the receiving terminal #1 that has successfully received data may not transmit a HARQ response (e.g., ACK) for the data. Alternatively, when decoding of the data is successful, the receiving terminal #1 may map an arbitrary sub-sequence (e.g., sub-sequence configured with '0's) to the feedback resource region #1. The receiving terminal #2 that has not received the data may transmit the sub-sequence #2 mapped to NACK for the data on the PSFCH (e.g., feedback resource region #2).

The transmitting terminal may detect one sequence by performing a monitoring operation on the PSFCH, and may identify the sub-sequence #2 included in the one sequence. That is, the one sub-sequence #2 may be detected in the PSFCH. In this case, the transmitting terminal may determine that decoding of the data in the receiving terminal #1 is successful, and may determine that decoding of the data in the receiving terminal #2 has failed.

In a case D when the NACK-only feedback scheme is used, the receiving terminal #1 that has successfully received data may not transmit a HARQ response (e.g., ACK) for the data. Alternatively, when decoding of the data is successful, the receiving terminal #1 may map an arbitrary sub-sequence (e.g., sub-sequence configured with '0's) to the feedback resource region #1. The receiving terminal #2 that has successfully received the data may not transmit a HARQ response (e.g., ACK) for the data. Alternatively, when decoding of the data is successful, the receiving terminal #2 may map an arbitrary sub-sequence (e.g., sub-sequence configured with '0's) to the feedback resource region #2.

The transmitting terminal may perform a monitoring operation on the PSFCH to detect the sub-sequence(s). When the sub-sequence(s) is not detected or the sub-sequence(s) configured with '0's is detected, the transmitting terminal may determine that decoding of the data is successful in both the receiving terminals #1 and #2.

On the other hand, when a plurality of receiving terminals (e.g., receiving terminals #1 and #2) participate in sidelink communication (e.g., sidelink-groupcast communication) and the ACK/NACK feedback scheme is used, sub-sequences assigned (e.g., configured) respectively to the receiving terminals #1 and #2 may be defined as shown in Table 6 below. The same sub-sequence (e.g., sub-sequence #1) may be configured for ACKs of the receiving terminals #1 and #2. The same sub-sequence (e.g., sub-sequence #2) may be configured for NACKs of the receiving terminals #1 and #2. The sub-sequences #1 and #2 may be orthogonal sequences. Alternatively, the sub-sequence #1 may not be orthogonal to the sub-sequence #2.

TABLE 6

| Receiving terminal | Sequence | |
|---|---|---|
| | ACK | NACK |
| Receiving terminal #1 | Sub-sequence #1 | Sub-sequence #2 |
| Receiving terminal #2 | Sub-sequence #1 | Sub-sequence #2 |

The receiving terminals #1 and #2 may transmit the sub-sequences mapped to the HARQ responses to the transmitting terminal on the same PSFCH. One sequence may be configured as a combination of one sub-sequence (e.g., sub-sequence #1 or sub-sequence #2) transmitted by the receiving terminal #1 and one sub-sequence (e.g., sub-sequence #1 or sub-sequence #2) transmitted by the receiving terminal #2. For example, the sub-sequences defined in Table 6 may be transmitted as follows.

Figure 10:
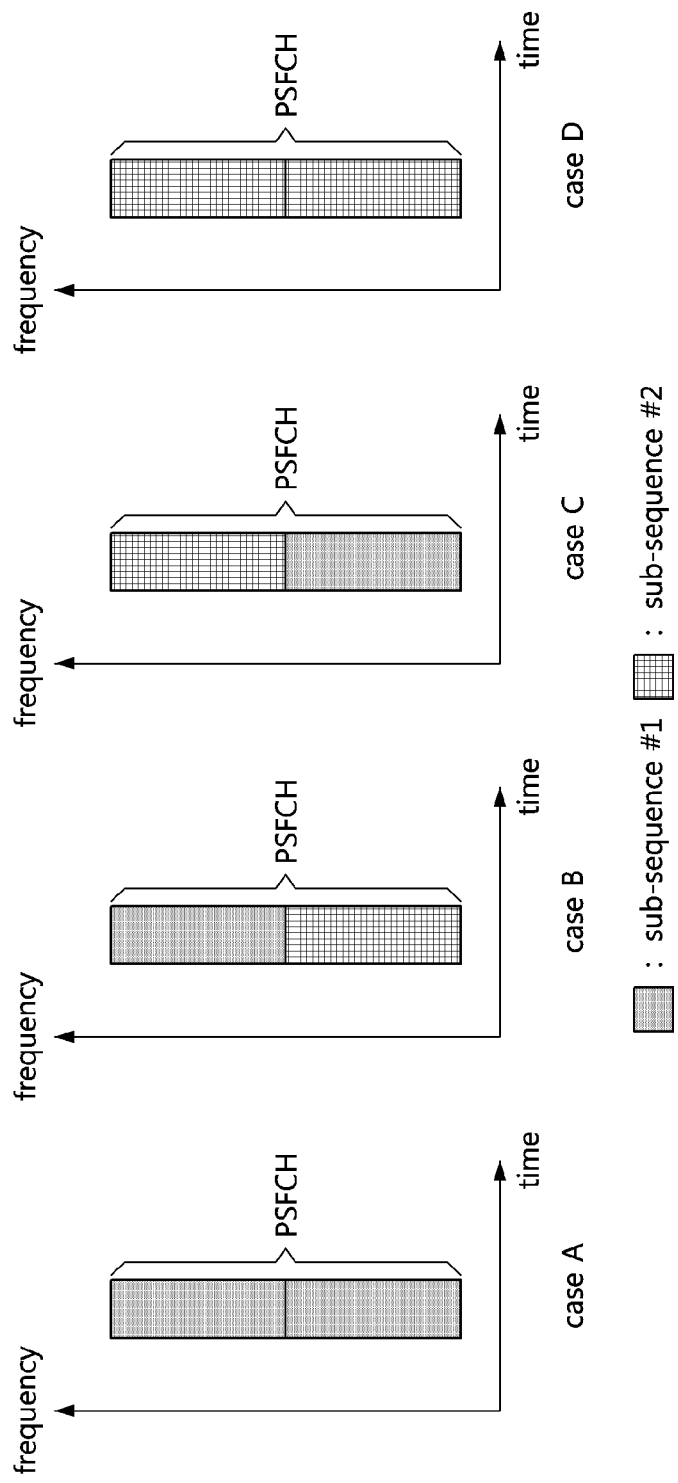
FIG. 10 is a conceptual diagram illustrating a first exemplary embodiment of a method for transmitting and receiving HARQ responses using sub-sequences defined in Table 6 in a communication system supporting sidelink communication.

FIG. 10 is a conceptual diagram illustrating a first exemplary embodiment of a method for transmitting and receiving HARQ responses using sub-sequences defined in Table 6 in a communication system supporting sidelink communication.

As shown in FIG. 10, a PSFCH may be configured with one or more symbols in the time domain and one or more RBs in the frequency domain. The PSFCH may include feedback resource regions #1 and #2. The feedback resource region #1 may be multiplexed with the feedback resource region #2 in one or more domains among the frequency domain and the time domain. Each of the feedback resource regions #1 and #2 may be configured with consecutive resources (e.g., consecutive REs) or non-consecutive resources. The feedback resource region #1 may be used for transmission of the sub-sequence (e.g., HARQ response) of the receiving terminal #1, and the feedback resource region #2 may be used for transmission of the sub-sequence (e.g., HARQ response) of the receiving terminal #2.

Each of the receiving terminals #1 and #2 may map the corresponding sub-sequence to consecutive or non-consecutive physical resources. Alternatively, each of the receiving terminals #1 and #2 may map the corresponding sub-sequence to consecutive or non-consecutive virtual resources (e.g., VREs), and may map the virtual resources to physical resources according to a preconfigured mapping relationship. Here, the physical resources may mean the PSFCH (e.g., feedback resource region). The transmitting terminal may know the sub-sequence(s) allocated to each of the receiving terminals #1 and #2, and may know the feedback resource region used by each of the receiving terminals #1 and #2.

In a case A, the receiving terminal #1 may transmit the sub-sequence #1 mapped to ACK for data from the transmitting terminal on the PSFCH (e.g., feedback resource region #1), and the receiving terminal #2 may transmit the sub-sequence #1 mapped to ACK for the data on the PSFCH (e.g., feedback resource region #2). In this case, the sub-sequence #1 may be repeated within one sequence. The transmitting terminal may detect one sequence by performing a monitoring operation on the PSFCH, and may identify the repeated sub-sequence #1 included in the one sequence. When the repeated sub-sequence #1 is detected, the transmitting terminal may determine that decoding of the data is successful in both the receiving terminals #1 and #2.

In a case B, the receiving terminal #1 may transmit the sub-sequence #1 mapped to ACK for data on the PSFCH (e.g., feedback resource region #1). The receiving terminal #2 may transmit the sub-sequence #2 mapped to NACK for the data on the PSFCH (e.g., feedback resource region #2). Here, one sequence may be configured with the sub-sequence #1 and the sub-sequence #2. The transmitting terminal may detect the one sequence by performing a monitoring operation on the PSFCH, and may identify the sub-sequences #1 and #2 included in the one sequence. In this case, the transmitting terminal may determine that decoding of the data in the receiving terminal #1 is successful, and may determine that the decoding of the data in the receiving terminal #2 has failed.

In a case C, the receiving terminal #1 may transmit the sub-sequence #2 mapped to NACK for data on the PSFCH (e.g., feedback resource region #1), and the receiving terminal #2 may transmit the sub-sequence #1 mapped to ACK for the data on the PSFCH (e.g., feedback resource region #2). Here, one sequence may be configured with the sub-sequence #2 and the sub-sequence #1. The transmitting terminal may detect the one sequence by performing a monitoring operation on the PSFCH, and may identify the sub-sequences #2 and #1 included in the one sequence. In this case, the transmitting terminal may determine that decoding of the data in the receiving terminal #1 has failed, and may determine that the decoding of the data in the receiving terminal #2 is successful. The order of the sub-sequences included in the sequence in the case C may be reversed from the order of the sub-sequences included in the sequence in the case B.

In a case D, the receiving terminal #1 may transmit the sub-sequence #2 mapped to NACK for data on the PSFCH (e.g., feedback resource region #1), and the receiving terminal #2 may transmit the sub-sequence #2 mapped to NACK for the data on the PSFCH (e.g., feedback resource region #2). In this case, the sub-sequence #2 may be repeated within one sequence. The transmitting terminal may detect the one sequence by performing a monitoring operation on the PSFCH, and may identify the repeated sub-sequence #2 included in the one sequence. When the repeated sub-sequence #2 is detected, the transmitting terminal may determine that decoding of the data in both the receiving terminals #1 and #2 has failed.

On the other hand, when a plurality of receiving terminals (e.g., receiving terminals #1 to #3) participate in sidelink communication (e.g., sidelink-groupcast communication) and the ACK/NACK feedback scheme is used, sub-sequences assigned (e.g., configured) respectively to the receiving terminals #1 to #3 may be defined as shown in Table 7 below. The sub-sequences #1 to #6 may be orthogonal to each other. That is, the sub-sequences #1 to #6 may be orthogonal sequences. Alternatively, at least two sub-sequences among the sub-sequences #1 to #6 may be orthogonal to each other.

TABLE 7

| Receiving terminal | Sequence | |
| --- | --- | --- |
| | ACK | NACK |
| Receiving terminal #1 | Sub-sequence #1 | Sub-sequence #2 |
| Receiving terminal #2 | Sub-sequence #3 | Sub-sequence #4 |
| Receiving terminal #3 | Sub-sequence #5 | Sub-sequence #6 |

The receiving terminals #1 to #3 may transmit the sub-sequences mapped to the HARQ responses to the transmitting terminal on the same PSFCH. One sequence may be configured as a combination of one sub-sequence (e.g., sub-sequence #1 or sub-sequence #2) transmitted by the receiving terminal #1, one sub-sequence (e.g., sub-sequence #3 or sub-sequence #4) transmitted by the receiving terminal #2, and one sub-sequence (e.g., sub-sequence #5 or sub-sequence #6) transmitted by the receiving terminal #3. The sub-sequences defined in Table 7 may be transmitted as follows.

Figure 11B:
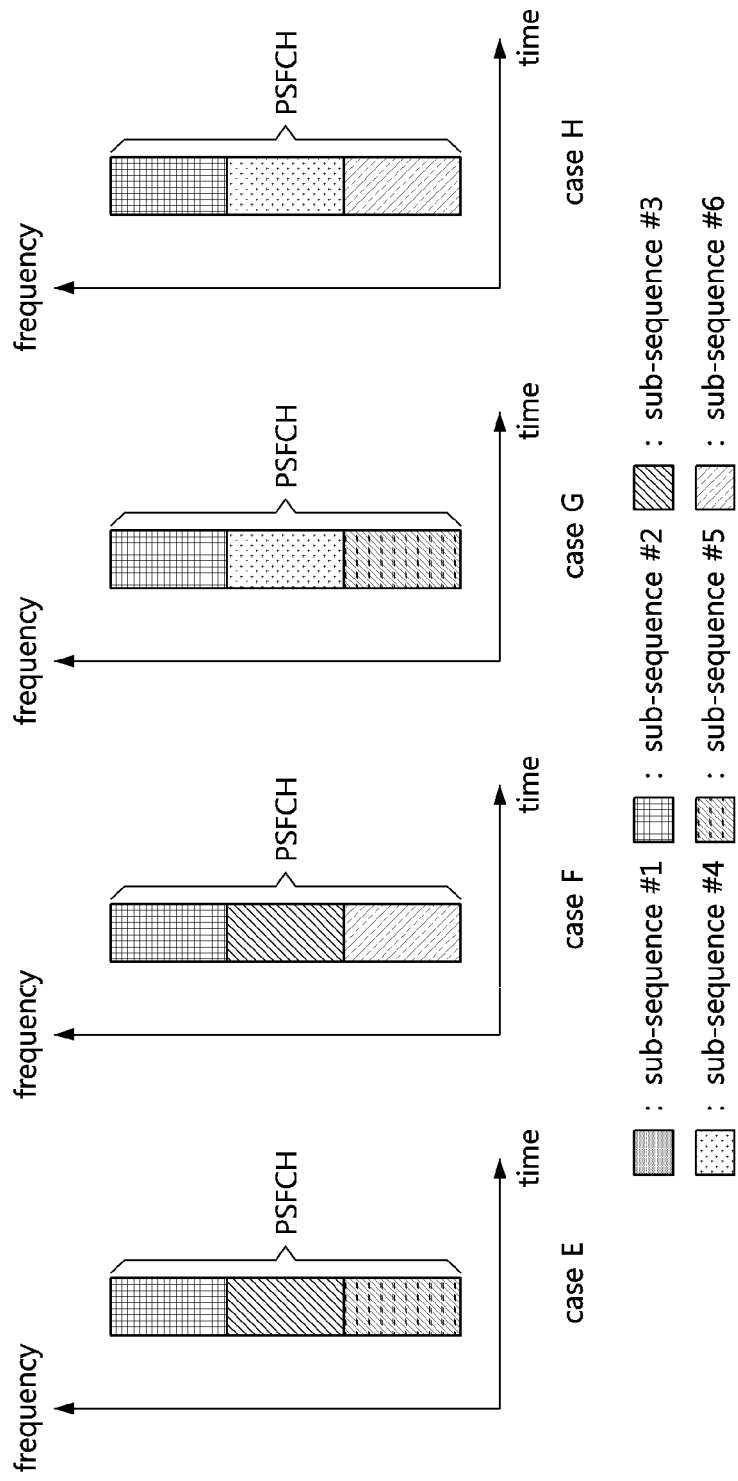

FIGS. 11A and 11B are conceptual diagrams illustrating a first exemplary embodiment of a method for transmitting and receiving HARQ responses using sub-sequences defined in Table 7 in a communication system supporting sidelink communication.

As shown in FIGS. 11A and 11B, a PSFCH may be configured with one or more symbols in the time domain and one or more RBs in the frequency domain. The PSFCH may include feedback resource regions #1 to #3. The feedback resource regions #1 to #3 may be multiplexed in one or more domains among the frequency domain and the time domain. Each of the feedback resource regions #1 to #3 may be configured with consecutive resources (e.g., consecutive REs) or non-consecutive resources. The feedback resource region #1 may be used for transmission of the sub-sequence (e.g., HARQ response) of the receiving terminal #1, the feedback resource region #2 may be used for transmission of the sub-sequence (e.g., HARQ response) of the receiving terminal #2, and the feedback resource region #3 may be used for transmission of the sub-sequence (e.g., HARQ response) of the receiving terminal #3.

Each of the receiving terminals #1 to #3 may map the corresponding sub-sequence to consecutive or non-consecutive physical resources. Alternatively, each of the receiving terminals #1 to #3 may map the corresponding sub-sequence to consecutive or non-consecutive virtual resources (e.g., VREs), and may map the virtual resources to physical resources according to a preconfigured mapping relationship. Here, the physical resources may mean the PSFCH (e.g., feedback resource region). The transmitting terminal may know the sub-sequence(s) assigned to each of the receiving terminals #1 to #3, and may know the feedback resource region used by each of the receiving terminals #1 to #3. The exemplary embodiments shown in FIGS. 11A and 11B may be applied to sidelink communication in which three receiving terminals participate as well as sidelink communication in which a plurality of receiving terminals participate.

In a case A, the receiving terminal #1 may transmit the sub-sequence #1 mapped to ACK for data on the PSFCH (e.g., feedback resource region #1), the receiving terminal #2 may transmit the sub-sequence #3 mapped to ACK for the data on the PSFCH (e.g., feedback resource region #2), and the receiving terminal #3 may transmit the sub-sequence #5 mapped to ACK for the data on the PSFCH (e.g., feedback resource region #3). Here, one sequence may be configured with the sub-sequences #1, #3, and #5. The transmitting terminal may detect the one sequence by performing a monitoring operation on the PSFCH, and may identify the sub-sequences #1, #3, and #5 included in the one sequence. In this case, the transmitting terminal may determine that decoding of the data is successful in all of the receiving terminals #1 to #3.

In a case B, the receiving terminal #1 may transmit the sub-sequence #1 mapped to ACK for data on the PSFCH (e.g., feedback resource region #1), the receiving terminal #2 may transmit the sub-sequence #3 mapped to ACK for the data on the PSFCH (e.g., feedback resource region #2), and the receiving terminal #3 may transmit the sub-sequence #6 mapped to NACK for the data on the PSFCH (e.g., feedback resource region #3). Here, one sequence may be configured with the sub-sequences #1, #3, and #6. The transmitting terminal may detect the one sequence by performing a monitoring operation on the PSFCH, and may identify the sub-sequences #1, #3, and #6 included in the one sequence. In this case, the transmitting terminal may determine that decoding of the data is successful in the receiving terminals #1 and #2, and may determine that decoding of the data in the receiving terminal #3 has failed.

In a case C, the receiving terminal #1 may transmit the sub-sequence #1 mapped to ACK for data on the PSFCH (e.g., feedback resource region #1), the receiving terminal #2 may transmit the sub-sequence #4 mapped to NACK for the data on the PSFCH (e.g., feedback resource region #2), and the receiving terminal #3 may transmit the sub-sequence #6 mapped to NACK for the data on the PSFCH (e.g., feedback resource region #3). Here, one sequence may be configured with the sub-sequences #1, #4, and #6. The transmitting terminal may detect the one sequence by performing a monitoring operation on the PSFCH, and may identify the sub-sequences #1, #4, and #6 included in the one sequence. In this case, the transmitting terminal may determine that decoding of the data in the receiving terminal #1 is successful, and may determine that the decoding of the data in the receiving terminals #2 and #3 has failed.

In a case D, the receiving terminal #1 may transmit the sub-sequence #1 mapped to ACK for data on the PSFCH (e.g., feedback resource region #1), the receiving terminal #2 may transmit the sub-sequence #4 mapped to NACK for the data on the PSFCH (e.g., feedback resource region #2), and the receiving terminal #3 may transmit the sub-sequence #5 mapped to ACK for the data on the PSFCH (e.g., feedback resource region #3). Here, one sequence may be configured with the sub-sequences #1, #4, and #5. The transmitting terminal may detect the one sequence by performing a monitoring operation on the PSFCH, and may identify the sub-sequences #1, #4, and #5 included in the one sequence. In this case, the transmitting terminal may determine that decoding of the data is successful in the receiving terminals #1 and #3, and may determine that decoding of the data in the receiving terminal #2 has failed.

In a case E, the receiving terminal #1 may transmit the sub-sequence #2 mapped to NACK for data on the PSFCH (e.g., feedback resource region #1), the receiving terminal #2 may transmit the sub-sequence #3 mapped to ACK for the data on the PSFCH (e.g., feedback resource region #2), and the receiving terminal #3 may transmit the sub-sequence #5 mapped to ACK for the data on the PSFCH (e.g., feedback resource region #3). Here, one sequence may be configured with the sub-sequences #2, #3, and #5. The transmitting terminal may detect the one sequence by performing a monitoring operation on the PSFCH, and may identify the sub-sequences #2, #3, and #5 included in the one sequence. In this case, the transmitting terminal may determine that decoding of the data in the receiving terminal #1 has failed, and may determine that the decoding of the data in the receiving terminals #2 and #3 is successful.

In a case F, the receiving terminal #1 may transmit the sub-sequence #2 mapped to NACK for data on the PSFCH (e.g., feedback resource region #1), the receiving terminal #2 may transmit the sub-sequence #3 mapped to ACK for the data on the PSFCH (e.g., feedback resource region #2), and the receiving terminal #3 may transmit the sub-sequence #6 mapped to NACK for the data on the PSFCH (e.g., feedback resource region #3). Here, one sequence may be configured with the sub-sequences #2, #3, and #6. The transmitting terminal may detect the one sequence by performing a monitoring operation on the PSFCH, and may identify the sub-sequences #2, #3, and #6 included in the one sequence. In this case, the transmitting terminal may determine that decoding of the data in the receiving terminals #1 and #3 has failed, and may determine that the decoding of the data in the receiving terminal #2 is successful.

In a case G, the receiving terminal #1 may transmit the sub-sequence #2 mapped to NACK for data on the PSFCH (e.g., feedback resource region #1), the receiving terminal #2 may transmit the sub-sequence #4 mapped to NACK for the data on the PSFCH (e.g., feedback resource region #2), and the receiving terminal #3 may transmit the sub-sequence #5 mapped to ACK for the data on the PSFCH (e.g., feedback resource region #3). Here, one sequence may be configured with the sub-sequences #2, #4, and #5. The transmitting terminal may detect the one sequence by performing a monitoring operation on the PSFCH, and may identify the sub-sequences #2, #4, and #5 included in the one sequence. In this case, the transmitting terminal may determine that decoding of the data in the receiving terminals #1 and #2 has failed, and may determine that the decoding of the data in the receiving terminal #3 is successful.

In a case H, the receiving terminal #1 may transmit the sub-sequence #2 mapped to NACK for data on the PSFCH (e.g., feedback resource region #1), the receiving terminal #2 may transmit the sub-sequence #4 mapped to NACK for the data on the PSFCH (e.g., feedback resource region #2), and the receiving terminal #3 may transmit the sub-sequence #6 mapped to NACK for the data on the PSFCH (e.g., feedback resource region #3). The transmitting terminal may detect one sequence by performing a monitoring operation on the PSFCH, and may identify the sub-sequences #2, #4, and #6 included in the one sequence. In this case, the transmitting terminal may determine that decoding of data in the receiving terminals #1 to #3 has failed.

On the other hand, when a plurality of receiving terminals (e.g., receiving terminals #1 to #3) participate in sidelink communication (e.g., sidelink-groupcast communication) and the ACK-only feedback scheme is used, sub-sequences assigned (e.g., configured) respectively to the receiving terminals #1 to #3 may be defined as shown in Table 8 below. The sub-sequences #1 to #3 may be orthogonal sequences. Alternatively, the sub-sequences #1 to #3 may not be orthogonal to each other.

TABLE 8

| | Sequence | |
|---|---|---|
| Receiving terminal | ACK | NACK |
| Receiving terminal #1 | Sub-sequence #1 | — |
| Receiving terminal #2 | Sub-sequence #2 | — |
| Receiving terminal #3 | Sub-sequence #3 | — |

Alternatively, when a plurality of receiving terminals (e.g., receiving terminals #1 to #3) participate in sidelink communication (e.g., sidelink-groupcast communication) and the NACK-only feedback scheme is used, sub-sequences assigned (e.g., configured) respectively to the receiving terminals #1 to #3 may be defined as shown in Table 9 below. The sub-sequences #1 to #3 may be orthogonal sequences. Alternatively, the sub-sequences #1 to #3 may not be orthogonal to each other.

TABLE 9

| Receiving terminal | Sequence | |
|---|---|---|
| | ACK | NACK |
| Receiving terminal #1 | — | Sub-sequence #1 |
| Receiving terminal #2 | — | Sub-sequence #2 |
| Receiving terminal #3 | — | Sub-sequence #3 |

The receiving terminals #1 to #3 may transmit the sub-sequences mapped to the HARQ responses to the transmitting terminal on the same PSFCH. One sequence (e.g., long sequence or full sequence) may be configured as a combination of one or two or more sequences among one sub-sequence (e.g., sub-sequence #1) transmitted by the receiving terminal #1, one sub-sequence (e.g., sub-sequence #2) transmitted by the receiving terminal #2, and one sub-sequence (e.g., sub-sequence #3) transmitted by the receiving terminal #3. Alternatively, the one sequence may not include any sub-sequences. The sub-sequences defined in Table 8 or Table 9 may be transmitted as follows.

Figure 12A:
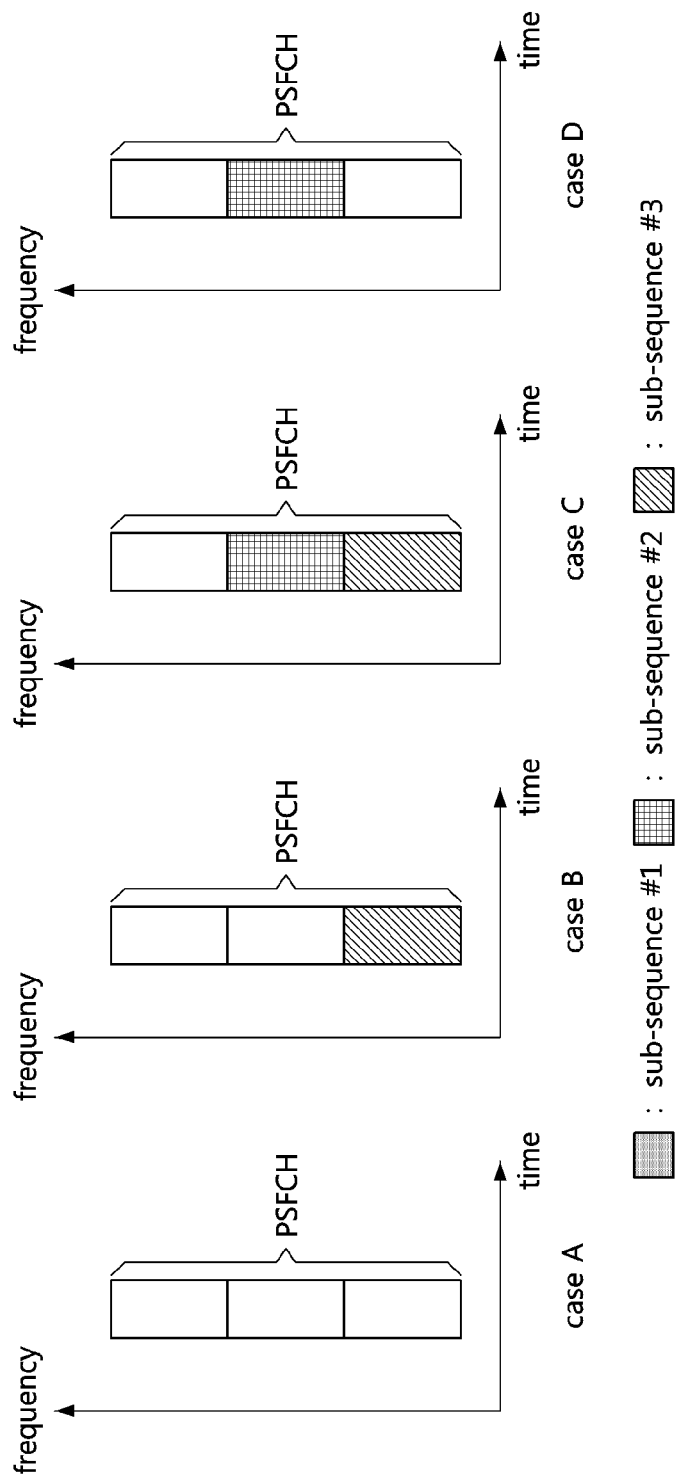
FIGS. 12A and 12B are conceptual diagrams illustrating a first exemplary embodiment of a method for transmitting and receiving HARQ responses using sub-sequences defined in Table 8 or Table 9 in a communication system supporting sidelink communication.
Figure 12B:
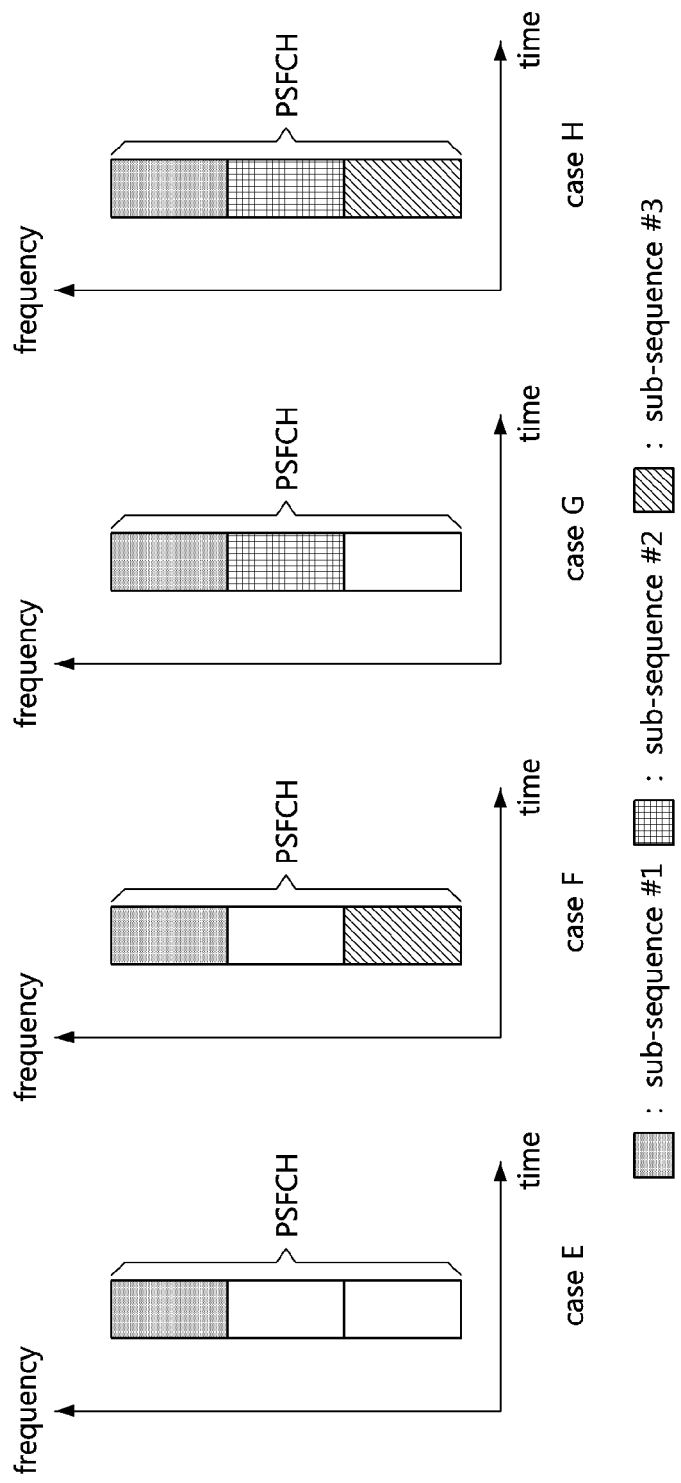

FIGS. 12A and 12B are conceptual diagrams illustrating a first exemplary embodiment of a method for transmitting and receiving HARQ responses using sub-sequences defined in Table 8 or Table 9 in a communication system supporting sidelink communication.

As shown in FIGS. 12A and 12B, a PSFCH may be configured with one or more symbols in the time domain and one or more RBs in the frequency domain. The PSFCH may include feedback resource regions #1 to #3. The feedback resource regions #1 to #3 may be multiplexed in one or more domains among the frequency domain and the time domain. Each of the feedback resource regions #1 to #3 may be configured with consecutive resources (e.g., consecutive REs) or non-consecutive resources. The feedback resource region #1 may be used for transmission of the sub-sequence (e.g., HARQ response) of the receiving terminal #1, the feedback resource region #2 may be used for transmission of the sub-sequence (e.g., HARQ response) of the receiving terminal #2, and the feedback resource region #3 may be used for transmission of the sub-sequence (e.g., HARQ response) of the receiving terminal #3.

Each of the receiving terminals #1 to #3 may map the corresponding sub-sequence to consecutive or non-consecutive physical resources (e.g., PREs). Alternatively, each of the receiving terminals #1 to #3 may map the corresponding sub-sequence to consecutive or non-consecutive virtual resources (e.g., VREs), and may map the virtual resources to physical resources according to a preconfigured mapping relationship. Here, the physical resources may mean the PSFCH (e.g., feedback resource region). The transmitting terminal may know the sub-sequence(s) assigned to each of the receiving terminals #1 to #3, and may know the feedback resource region used by each of the receiving terminals #1 to #3. The exemplary embodiments shown in FIGS. 12A and 12B may be applied to sidelink communication in which three receiving terminals participate as well as sidelink communication in which a plurality of receiving terminals participate.

ACK-Only Feedback Scheme

In a case A when the ACK-only feedback scheme is used, the receiving terminals #1 to #3 may not receive data from the transmitting terminal, and thus may not transmit the sub-sequences. Alternatively, the sequences transmitted from the receiving terminals #1 to #3 to the transmitting terminal may be configured with '0's. In this case, the transmitting terminal may determine that decoding of data in the receiving terminals #1 to #3 has failed.

In a case B when the ACK-only feedback scheme is used, the receiving terminals #1 and #2 may not receive data from the transmitting terminal, and thus may not transmit the sub-sequences. Alternatively, the sub-sequences transmitted from the receiving terminals #1 and #2 to the transmitting terminal may be configured with of '0's. The receiving terminal #3 may successfully receive data from the transmitting terminal, and may transmit the sub-sequence #3 accordingly. In this case, the transmitting terminal may determine that decoding of the data in the receiving terminals #1 and #2 has failed, and may determine that the decoding of the data in the receiving terminal #3 is successful.

In a case C when the ACK-only feedback scheme is used, the receiving terminal #1 may not receive data from the transmitting terminal, and thus may not transmit the sub-sequence. Alternatively, the sub-sequence transmitted from the receiving terminal #1 to the transmitting terminal may be configured with '0's. The receiving terminals #2 and #3 may successfully receive the data from the transmitting terminal, and accordingly, may transmit the sub-sequences #2 and #3, respectively. In this case, the transmitting terminal may determine that decoding of the data in the receiving terminal #1 has failed, and may determine that decoding of the data in the receiving terminals #2 and #3 is successful.

In a case D when the ACK-only feedback scheme is used, the receiving terminals #1 and #3 may not receive data from the transmitting terminal, and thus may not transmit the sub-sequences. Alternatively, the sub-sequences transmitted from the receiving terminals #1 and #3 to the transmitting terminal may be configured with '0's. The receiving terminal #2 may successfully receive the data from the transmitting terminal, and may transmit the sub-sequence #2 accordingly. In this case, the transmitting terminal may determine that decoding of the data in the receiving terminals #1 and #3 has failed, and may determine that the decoding of the data in the receiving terminal #2 is successful.

In a case E when the ACK-only feedback scheme is used, the receiving terminal #1 may successfully receive data from the transmitting terminal, and thus may transmit the sub-sequence #1. The receiving terminals #2 and #3 may not receive the data from the transmitting terminal, and thus may not transmit the sub-sequences. Alternatively, the sub-sequences transmitted from the receiving terminals #2 and #3 to the transmitting terminal may be configured with '0's. In this case, the transmitting terminal may determine that decoding of the data in the receiving terminal #1 is successful, and may determine that the decoding of the data in the receiving terminals #2 and #3 has failed.

In a case F when the ACK-only feedback scheme is used, the receiving terminals #1 and #3 may successfully receive data from the transmitting terminal, and accordingly, may transmit the sub-sequences #1 and #3, respectively. The receiving terminal #2 may not receive the data from the transmitting terminal, and thus may not transmit the sub-sequence. Alternatively, the sub-sequence transmitted from the receiving terminal #2 to the transmitting terminal may be configured with '0's. In this case, the transmitting terminal may determine that decoding of the data in the receiving terminals #1 and #3 is successful, and may determine that the decoding of the data in the receiving terminal #2 has failed.

In a case G when the ACK-only feedback scheme is used, the receiving terminals #1 and #2 may successfully receive data from the transmitting terminal, and accordingly, may transmit the sub-sequences #1 and #2, respectively. The receiving terminal #3 may not receive the data from the transmitting terminal, and thus may not transmit the sub-sequence. Alternatively, the sub-sequence transmitted from the receiving terminal #3 to the transmitting terminal may be configured with '0's. In this case, the transmitting terminal may determine that decoding of the data in the receiving terminals #1 and #2 is successful, and may determine that the decoding of the data in the receiving terminal #3 has failed.

In a case H when the ACK-only feedback scheme is used, the receiving terminals #1 to #3 may successfully receive data from the transmitting terminal, and accordingly, may transmit the sub-sequences #1 to #3, respectively. In this case, the transmitting terminal may determine that decoding of the data in the receiving terminals #1 to #3 is successful.

NACK-Only Feedback Scheme

In a case A when the NACK-only feedback scheme is used, the receiving terminals #1 to #3 may successfully receive data from the transmitting terminal, and thus may not transmit the sub-sequences. Alternatively, the sequences transmitted from the receiving terminals #1 to #3 to the transmitting terminal may be configured with '0'. In this case, the transmitting terminal may determine that decoding of the data in the receiving terminals #1 to #3 is successful.

In a case B when the NACK-only feedback scheme is used, the receiving terminals #1 and #2 may successfully receive data from the transmitting terminal, and thus may not transmit the sub-sequences. Alternatively, the sub-sequences transmitted from the receiving terminals #1 and #2 to the transmitting terminal may be configured with '0's. The receiving terminal #3 may not receive the data from the transmitting terminal, and thus may transmit the sub-sequence #3. In this case, the transmitting terminal may determine that decoding of the data in the receiving terminals #1 and #2 is successful, and may determine that the decoding of the data in the receiving terminal #3 has failed.

In a case C when the NACK-only feedback scheme is used, the receiving terminal #1 may successfully receive data from the transmitting terminal, and thus may not transmit the sub-sequence. Alternatively, the sub-sequence transmitted from the receiving terminal #1 to the transmitting terminal may be configured with '0's. The receiving terminals #2 and #3 may not receive the data from the transmitting terminal, and thus may transmit the sub-sequences #2 and #3, respectively. In this case, the transmitting terminal may determine that decoding of the data in the receiving terminal #1 is successful, and may determine that decoding of the data in the receiving terminals #2 and #3 has failed.

In a case D when the NACK-only feedback scheme is used, the receiving terminals #1 and #3 may successfully receive data from the transmitting terminal, and thus may not transmit the sub-sequences. Alternatively, the sub-sequences transmitted from the receiving terminals #1 and #3 to the transmitting terminal may be configured with '0's. The receiving terminal #2 may not receive the data from the transmitting terminal, and thus may transmit the sub-sequence #2. In this case, the transmitting terminal may determine that decoding of the data in the receiving terminals #1 and #3 is successful, and may determine that decoding of the data in the receiving terminal #2 has failed.

In a case E when the NACK-only feedback scheme is used, the receiving terminal #1 may not receive data from the transmitting terminal, and thus may transmit the sub-sequence #1. The receiving terminals #2 and #3 may successfully receive the data from the transmitting terminal, respectively, and thus may not transmit the sub-sequences. Alternatively, the sub-sequences transmitted from the receiving terminals #2 and #3 to the transmitting terminal may be configured with '0's. In this case, the transmitting terminal may determine that decoding of the data in the receiving terminal #1 has failed, and may determine that the decoding of the data in the receiving terminals #2 and #3 is successful.

In a case F when the NACK-only feedback scheme is used, the receiving terminals #1 and #3 may not receive data from the transmitting terminal, and thus may transmit the sub-sequences #1 and #3, respectively. The receiving terminal #2 may successfully receive the data from the transmitting terminal, and thus may not transmit the sub-sequence. Alternatively, the sub-sequence transmitted from the receiving terminal #2 to the transmitting terminal may be configured with '0's. In this case, the transmitting terminal may determine that decoding of the data in the receiving terminals #1 and #3 has failed, and may determine that the decoding of the data in the receiving terminal #2 is successful.

In a case G when the NACK-only feedback scheme is used, the receiving terminals #1 and #2 may not receive data from the transmitting terminal, and thus may transmit sub-sequences #1 and #2, respectively. The receiving terminal #3 may successfully receive the data from the transmitting terminal, and thus may not transmit the sub-sequence. Alternatively, the sub-sequence transmitted from the receiving terminal #3 to the transmitting terminal may be configured with '0's. In this case, the transmitting terminal may determine that decoding of the data in the receiving terminals #1 and #2 has failed, and may determine that the decoding of the data in the receiving terminal #3 is successful.

In a case H when the NACK-only feedback scheme is used, the receiving terminals #1 to #3 may not receive data from the transmitting terminal, and thus may transmit the sub-sequences #1 to #3, respectively. In this case, the transmitting terminal may determine that decoding of data in the receiving terminals #1 to #3 has failed.

On the other hand, when a plurality of receiving terminals (e.g., receiving terminals #1 to #4) participate in sidelink communication (e.g., sidelink-groupcast communication) and the ACK/NACK feedback scheme is used, sub-sequences assigned (e.g., configured) respectively to the receiving terminals #1 to #4 may be defined as shown in Table 10 below. The sub-sequences #1 to #8 may be orthogonal to each other. That is, the sub-sequences #1 to #8 may be orthogonal sequences. Alternatively, at least two sub-sequences among the sub-sequences #1 to #8 may be orthogonal to each other.

TABLE 10

| Receiving terminal | Sequence | |
|---|---|---|
| | ACK | NACK |
| Receiving terminal #1 | Sub-sequence #1 | Sub-sequence #4 |
| Receiving terminal #2 | Sub-sequence #2 | Sub-sequence #3 |

TABLE 10-continued

| Receiving terminal | Sequence | |
| --- | --- | --- |
| | ACK | NACK |
| Receiving terminal #3 | Sub-sequence #5 | Sub-sequence #8 |
| Receiving terminal #4 | Sub-sequence #6 | Sub-sequence #7 |

The receiving terminals #1 to #4 may transmit the sub-sequences mapped to the HARQ responses to the transmitting terminal on the same PSFCH. For example, the PSFCH may include feedback resource regions #1 to #4. In this case, the receiving terminal #1 may transmit the sub-sequence #1 or #4 in the feedback resource region #1, the receiving terminal #2 may transmit the sub-sequence #2 or #3 in the feedback resource region #2, the receiving terminal #3 may transmit the sub-sequence #5 or #8 in the feedback resource region #3, and the receiving terminal #4 may transmit the sub-sequence #6 or #7 in the feedback resource region #4.

One sequence may be a combination of one sub-sequence (e.g., sub-sequence #1 or sub-sequence #4) transmitted by the receiving terminal #1, one sub-sequence (e.g., sub-sequence #2 or sub-sequence #3) transmitted by the receiving terminal #2, one sub-sequence (e.g., sub-sequence #5 or sub-sequence #8) transmitted by the receiving terminal #3, and one sub-sequence (e.g., sub-sequence #6 or sub-sequence #7) transmitted by the receiving terminal #4.

The transmitting terminal may receive a sequence from the receiving terminals #1 to #4 by performing a monitoring operation on the PSFCH, may detect sub-sequences included in the sequence, and based on the sub-sequences, may identify the HARQ response (e.g., ACK or NACK) transmitted by each of the receiving terminal #1 to #4.

Alternatively, the PSFCH may include feedback resource regions #1 and #2. In this case, the receiving terminal #1 may transmit the sub-sequence #1 or #4 in the feedback resource region #1, the receiving terminal #2 may transmit the sub-sequence #2 or #3 in the feedback resource region #1, the receiving terminal #3 may transmit the sub-sequence #5 or #8 in the feedback resource region #2, and the receiving terminal #4 may transmit the sub-sequence #6 or #7 in the feedback resource region #2. That is, a plurality of sub-sequences may be multiplexed in the same feedback resource region. When a plurality of sub-sequences multiplexed in the same feedback resource region are orthogonal, the transmitting terminal may identify each of the plurality of sub-sequences based on the orthogonality of the plurality of sub-sequences. For example, the transmitting terminal may receive a sequence from the receiving terminals #1 to #4 by performing a monitoring operation on the PSFCH, detect sub-sequences included in the sequence, and based on the sub-sequences, may identify the HARQ response (e.g., ACK or NACK) transmitted by each of the receiving terminal #1 to #4.

[Design Method of Reference Signal for Sequence (e.g., Sub-Sequence) Detection]

Sub-sequences corresponding to HARQ responses of a plurality of receiving terminals may be multiplexed within one sequence. The sub-sequences may be transmitted in orthogonal physical resources (e.g., different feedback resource regions). Alternatively, the sub-sequences may be transmitted in the same physical resource (e.g., in the same feedback resource region). Alternatively, the above two schemes may be used together. For example, some sub-sequences may be transmitted in orthogonal physical resources, and the remaining sub-sequences may be transmitted in the same physical resource.

In order to ensure the detection performance of the sequences (e.g., sub-sequences) in the transmitting terminal, a plurality of receiving terminals may transmit reference signals (e.g., DM-RS, CSI-RS, SRS) to the transmitting terminal. The transmitting terminal may receive the reference signals from the plurality of receiving terminals, may estimate channels based on the reference signals, and may detect the sequences (e.g., sub-sequences) based on the estimated channels. When the sub-sequences are not multiplexed, reference signals defined in the existing communication system (e.g., LTE communication system or NR communication system) may be used. When the sub-sequences are multiplexed, the following reference signals may be used.

Figure 13:
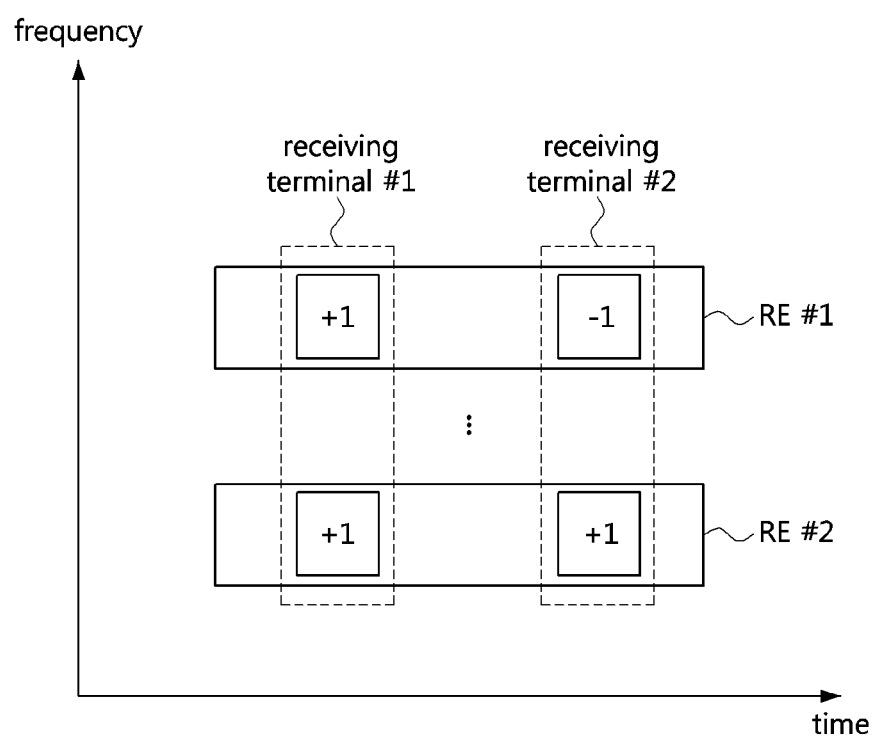
FIG. 13 is a conceptual diagram illustrating a first exemplary embodiment of reference signals in a communication system supporting sidelink communication.

FIG. 13 is a conceptual diagram illustrating a first exemplary embodiment of reference signals in a communication system supporting sidelink communication.

As shown in FIG. 13, each of receiving terminals #1 and #2 may transmit a sub-sequence to a transmitting terminal. The sub-sequence of the receiving terminal #1 may be multiplexed with the sub-sequence of the receiving terminal #2 in one sequence. The sub-sequences of the receiving terminals #1 and #2 may be transmitted in different physical resources (e.g., different feedback resource regions) or in the same physical resource (e.g., the same feedback resource region).

In order to ensure the detection performance of the sub-sequences, the receiving terminals #1 and #2 may transmit reference signals to the transmitting terminal. In the time domain, the reference signals may be located in the same symbol as a symbol to which the sub-sequence(s) is mapped, or in a different symbol (e.g., adjacent symbol). When the symbol to which the reference signal is mapped is the same as the symbol to which the sub-sequence(s) is mapped in the time domain, the reference signal may be arranged in RE(s) to which the sub-sequence(s) is not mapped in the frequency domain. The reference signals may be arranged at regular intervals in the frequency domain.

The reference signal of the receiving terminal #1 and the reference signal of the receiving terminal #2 may be mapped to the same physical resource(s) (e.g., the same RE(s)). For example, the reference signal (+1) of the receiving terminal #1 and the reference signal (−1) of the receiving terminal #2 may be mapped to an RE #1, and the reference signal (+1) of the receiving terminal #1 and the reference signal (+1) of the receiving terminal #2 may be mapped to an RE #2. In each of the REs, a channel state h between the receiving terminal and the transmitting terminal may be assumed to be the same. The channel state between the receiving terminal #1 and the transmitting terminal may be referred to as h1, and the channel state between the receiving terminal #2 and the transmitting terminal may be referred to as h2.

The transmitting terminal may receive the reference signals from the receiving terminals #1 and #2. For example, the transmitting terminal may receive the reference signals in the RE #1, and a channel state estimated based on the reference signals may be 'h1−h2'. In addition, the transmitting terminal may receive the reference signals in the RE #2, and a channel state estimated based on the reference signals may be 'h1+h2'. The transmitting terminal may estimate each of h1 and h2 by using 'h1−h2' and 'h1+h2'. That is, the transmitting terminal may estimate the channel state h1 between the receiving terminal #1 and the transmitting terminal, and may estimate the channel state h2 between the receiving terminal #2 and the transmitting terminal. The transmitting terminal may detect the sub-sequences of the receiving terminals #1 and #2 based on the estimated channel states h1 and h2. When channel states between adjacent REs are similar, a reference signal for a sequence (e.g., sub-sequence) having a long length may be configured as follows.

Figure 14:
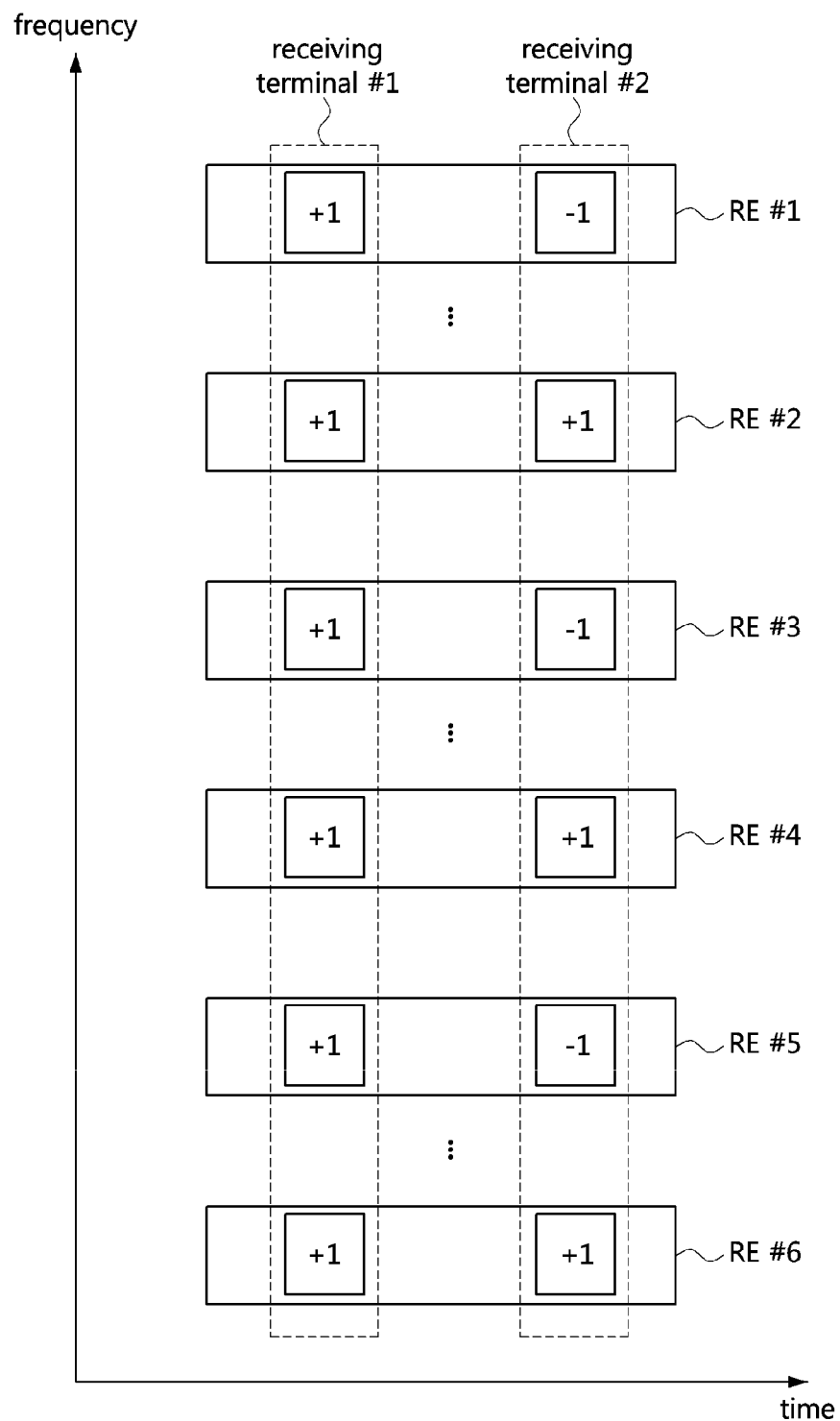
FIG. 14 is a conceptual diagram illustrating a second exemplary embodiment of reference signals in a communication system supporting sidelink communication.

FIG. 14 is a conceptual diagram illustrating a second exemplary embodiment of reference signals in a communication system supporting sidelink communication.

As shown in FIG. 14, each of receiving terminals #1 and #2 may transmit a sub-sequence to a transmitting terminal. The sub-sequence of the receiving terminal #1 may be multiplexed with the sub-sequence of the receiving terminal #2 in one sequence. The sub-sequences of the receiving terminals #1 and #2 may be transmitted in different physical resources (e.g., different feedback resource regions) or in the same physical resource (e.g., the same feedback resource region).

The reference signal of the receiving terminal #1 and the reference signal of the receiving terminal #2 may be mapped to the same physical resource(s) (e.g., the same RE(s)). The reference signal of each of the receiving terminals #1 and #2 may be mapped to six REs. The reference signal may be mapped to REs arranged at regular intervals in the frequency domain. The transmitting terminal may estimate each channel state based on reference signal(s) obtained from REs belonging to a specific resource region. For example, the transmitting terminal may estimate one channel state based on the reference signals obtained from the REs #1 and #2, and the corresponding channel state may be used as a representative channel for the resource region (e.g., frequency resource region) to which the REs #1 and #2 belong.

The transmitting terminal may estimate one channel state based on the reference signals obtained from the REs #3 and #4, and the corresponding channel state may be used as a representative channel for the resource region (e.g., frequency resource region) to which the REs #3 and #4 belong. The transmitting terminal may estimate one channel state based on the reference signals obtained from the REs #5 and #6, and the corresponding channel state may be used as a representative channel for the resource region (e.g., frequency resource region) to which the REs #5 and #6 belong. The transmitting terminal may improve the accuracy of channel estimation by performing an interpolation operation on the estimated channel state(s) (e.g., representative channel state(s)).

The above-described method may be a method of estimating the channel state of each receiving terminal based on the reference signal (e.g., a plurality of REs to which the reference signal is mapped). The reference signal shown in FIG. 13 and/or the reference signal shown in FIG. 14 may be applied by being extended to a case where the number of receiving terminals participating in sidelink communication (e.g., sidelink-groupcast communication) increases or a case where a frequency resource region in which the sub-sequences (e.g., sub-sequences) are transmitted increases.

The pattern (e.g., [+1,−1], [+1,+1], [−1,−1]) of the reference signals may be configured as various combinations in order to estimate channel states of a plurality of receiving terminals (e.g., a plurality of receiving terminals sequences (e.g., sub-sequences) in the same resource region). When three receiving terminals transmit sequences (e.g., sub-sequences) in the same resource region (e.g., PSFCH or feedback resource region), the reference signals may be configured as follows.

Figure 15:
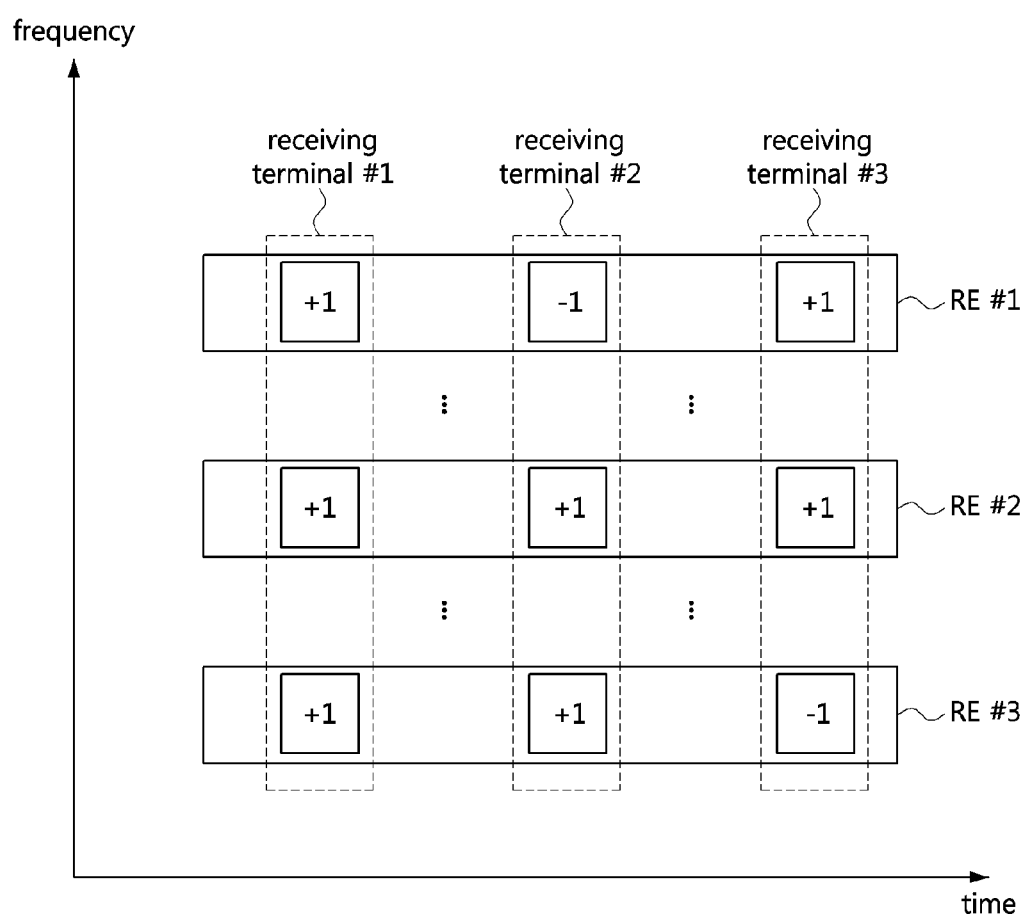
FIG. 15 is a conceptual diagram illustrating a third exemplary embodiment of reference signals in a communication system supporting sidelink communication.

FIG. 15 is a conceptual diagram illustrating a third exemplary embodiment of reference signals in a communication system supporting sidelink communication.

As shown in FIG. 15, each of receiving terminals #1 and #2 may transmit a sub-sequence to a transmitting terminal. The sub-sequence of the receiving terminal #1 may be multiplexed with the sub-sequence of the receiving terminal #2 in one sequence. The sub-sequences of the receiving terminals #1 and #2 may be transmitted in different physical resources (e.g., different feedback resource regions) or in the same physical resource (e.g., the same feedback resource region)

The reference signals of the receiving terminals #1 to #3 may be mapped to the same physical resource(s) (e.g., the same RE(s)). The reference signals of the receiving terminals #1 to #3 may be mapped to at least three REs. The transmitting terminal may estimate a channel state (e.g., channel state for a frequency resource domain) for each receiving terminal by using the reference signals mapped to at least three REs.

Meanwhile, sidelink communication based on the above-described methods (e.g., methods for transmitting/receiving sequence-based HARQ responses, and method for transmitting/receiving reference signals for sequence detection) may be performed as follows.

Figure 16:
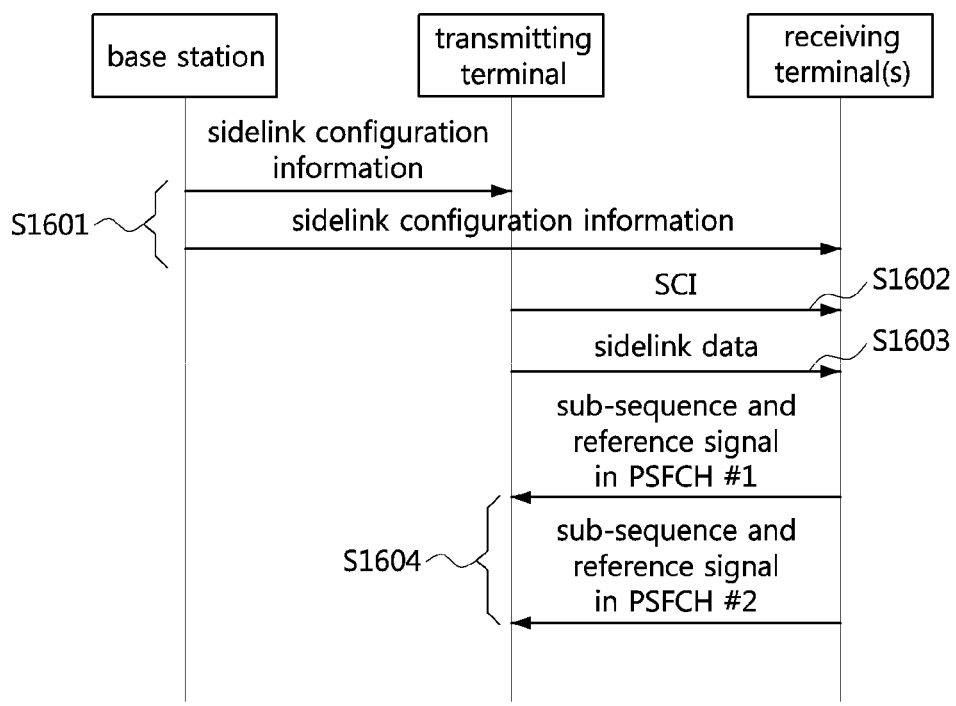
FIG. 16 is a sequence chart illustrating a second exemplary embodiment of a method for transmitting and receiving HARQ responses in a communication system supporting sidelink communication.

FIG. 16 is a sequence chart illustrating a second exemplary embodiment of a method for transmitting and receiving HARQ responses in a communication system supporting sidelink communication.

As shown in FIG. 16, a communication system may include a base station, a transmitting terminal, and receiving terminal(s). The transmitting terminal may be a terminal transmitting sidelink data (e.g., PSSCH), and the receiving terminal(s) may be a terminal receiving the sidelink data. The base station may be the base station 210 shown in FIG. 2. The transmitting terminal may be the UE 235 shown in FIG. 2, and the receiving terminal(s) may be the UE 236 shown in FIG. 2. Alternatively, the transmitting terminal may be the UE 236 shown in FIG. 2, and the receiving terminal(s) may be the UE 235 shown in FIG. 2. Each of the transmitting terminal and the receiving terminal(s) may be located in a corresponding vehicle. The base station, transmitting terminal, and receiving terminal(s) may be configured identically or similarly to the communication node 300 shown in FIG. 3. The transmitting terminal and receiving terminal(s) may support the protocol stacks shown in FIGS. 4 to 6. The transmitting terminal and receiving terminal(s) may be connected to the base station, and may perform sidelink communication based on scheduling of the base station. Alternatively, the transmitting terminal and receiving terminal(s) may be located outside coverage of the base station, and may perform sidelink communication without scheduling of the base station.

The base station may generate sidelink configuration information and transmit the sidelink configuration information through higher layer signaling (S1601). The sidelink configuration information may include PSFCH configuration information (e.g., SL-PSFCH-Config). The PSFCH configuration information may include one or more information elements among information elements shown in Table 11 below. When a plurality of PSFCHs (e.g., PSFCH #1 and #2) are used, the sidelink configuration information may include PSFCH configuration information #1 for the PSFCH #1 and PSFCH configuration information #2 for the PSFCH #2. When the number of terminals (e.g., receiving terminals) participating in sidelink communication (e.g., sidelink-groupcast communication) is less than or equal to a threshold, one PSFCH (e.g., PSFCH #1) may be used, and when the number of terminals participating in sidelink communication exceeds a threshold, a plurality of PSFCHs (e.g., PSFCHs #1 and #2) may be used. Each of the PSFCH configuration information #1 and the PSFCH configuration information #2 may include one or more information elements among information elements shown in Table 11 below.

TABLE 11

| Information element | Description |
| --- | --- |
| sl-PSFCH-Period | sl-PSFCH-Period may indicate a period of a PSFCH resource region within a resource pool. sl-PSFCH-Period may be set in units of slots. |
| sl-PSFCH_Duration | sl-PSFCH-Duration may indicate a length of a PSFCH resource region in the time domain. sl-PSFCH-Duration may be set in units of symbols. For example, sl-PSFCH-Duration may indicate one, two, three, or four symbols. |
| sl-PSFCH-RB-Set | sl-PSFCH-RB-Set may indicate a set of PRBs (e.g., the number of PRBs included in the set of PRBs) of a PSFCH resource region used for transmitting and receiving PSFCH(s). The set of PRBs may include one or more PRBs (e.g., RBs). |
| sl-Feedback-RB-Set1 | sl-Feedback-RB-Set1 may indicate a set of PRBs (e.g., the number of PRBs included in the set of PRBs) of a feedback resource region #1 included in a PSFCH resource region. The set of PRBs may include one or more PRBs (e.g., RBs). |
| sl-Feedback-RB-Set2 | sl-Feedback-RB-Set1 may indicate a set of PRBs (e.g., the number of PRBs included in the set of PRBs) of a feedback resource region #2 included in a PSFCH resource region. The set of PRBs may include one or more PRBs (e.g., RBs). |
| sl-Feedback-Sym1 | sl-Feedback-Sym1 may indicate the number and/or index(es) of symbol(s) in which a feedback resource region #1 is disposed, when a PSFCH resource region is configured with a plurality of symbols. |
| sl-Feedback-Sym2 | sl-Feedback-Sym2 may indicate the number and/or index(es) of symbol(s) in which a feedback resource region #2 is disposed, when a PSFCH resource region is configured with a plurality of symbols. |

When a PSFCH resource region (e.g., PSFCH) includes one feedback resource region, the PSFCH configuration information may include configuration information (e.g., sl-Feedback-RB-Set1, sl-Feedback-Sym1) of one feedback resource region. When a PSFCH resource region includes a plurality of feedback resource regions, the PSFCH configuration information may include configuration information (e.g., sl-Feedback-RB-Set1, sl-Feedback-Sym1, sl-Feedback-RB-Set2, sl-Feedback-Sym2) of the plurality of feedback resource regions.

The PSFCH configuration information (or sidelink configuration information) may further include configuration information on a HARQ feedback scheme. The HARQ feedback scheme may include the ACK/NACK feedback scheme, the ACK-only feedback scheme, and the NACK-only feedback scheme. The HARQ feedback scheme may be configured for each of resource pools (e.g., sidelink resource pools), and mapping information between the HARQ feedback scheme and the resource pool may be included in the PSFCH configuration information (or sidelink configuration information). The configuration information on the HARQ feedback scheme (e.g., mapping information between the HARQ feedback scheme and the resource pool) may be indicated by one or a combination of two or more of higher layer signaling, MAC signaling, and PHY signaling. In sidelink-groupcast communication, an appropriate HARQ feedback scheme may be used according to various requirements. The configuration information on the feedback scheme may be configured as shown in Table 12 or Table 13 below.

TABLE 12

| Information element | Description |
| --- | --- |
| sl-HARQ-Type1 | sl-HARQ-Type1 may indicate whether the ACK/NACK feedback scheme is used. sl-HARQ-Type1 set to 0 may indicate that the ACK/NACK feedback scheme is not used. sl-HARQ-Type1 set to 1 may indicate that the ACK/NACK feedback scheme can be used. |
| sl-HARQ-Type2 | sl-HARQ-Type2 may indicate whether the ACK-only feedback scheme is used. sl-HARQ-Type2 set to 0 may indicate that the ACK-only feedback scheme is not used. sl-HARQ-Type2 set to 1 may indicate that the ACK-only feedback scheme can be used. |
| sl-HARQ-Type3 | sl-HARQ-Type3 may indicate whether the NACK-only feedback scheme is used. sl-HARQ-Type3 set to 0 may indicate that the NACK-only feedback scheme is not used. sl-HARQ-Type3 set to 1 may indicate that the NACK-only feedback scheme can be used. |

When one of sl-HARQ-Type1, sl-HARQ-Type2, and sl-HARQ-Type3 is indicated to be available, the HARQ feedback scheme (e.g., ACK/NACK feedback scheme, ACK-only feedback scheme, or NACK-only feedback scheme) configured by higher layer signaling may be used in sidelink communication. When at least two feedback schemes among sl-HARQ-Type1, sl-HARQ-Type2, and sl-HARQ-Type3 are indicated to be available by higher layer signaling, one HARQ feedback scheme applied to sidelink communication may be indicated by higher layer signaling (e.g., a higher layer signaling message different from the higher layer signaling message indicating Table 12), MAC signaling, and/or PHY signaling.

TABLE 13

| Information element | Description |
| --- | --- |
| sl-Default-HARQ-Type | sl-Default-HARQ-Type may indicate a default HARQ feedback scheme or a current HARQ feedback scheme. sl-Default-HARQ-Type set to 00 may indicate the ACK/NACK feedback scheme, sl-Default-HARQ-Type set to 01 may indicate the ACK-only feedback scheme, and sl-Default-HARQ-Type set to 10 may indicate the NACK-only feedback scheme. |

Sidelink communication may be performed based on a HARQ feedback scheme indicated by sl-Default-HARQ-Type. Maintenance or change of the HARQ feedback scheme configured the by higher layer signaling may be indicated by higher layer signaling (e.g., a higher layer signaling message different from the higher layer signaling message indicating Table 13), MAC signaling, and/or PHY signaling. For example, when a toggle bit included in an RRC message, MAC CE, or control information (e.g., DCI or SCI) is set to 0, this may indicate that the HARQ feedback scheme configured by the higher layer signaling (e.g., sl-Default-HARQ-Type) is to be maintained. When the toggle bit included in the RRC message, MAC CE, or control information (e.g., DCI or SCI) is set to 1, this may indicate that the HARQ feedback scheme configured by the higher layer signaling (e.g., sl-Default-HARQ-Type) is to be changed.

The PSFCH configuration information (or sidelink configuration information) may further include configuration information on a sequence set. The configuration information on the sequence set may include information on one or more sequences. In addition, the configuration information on the sequence set may include information on one or more sub-sequences constituting each of the one or more sequences. The configuration information on the sequence set may indicate sub-sequence(s) mapped to a HARQ response (e.g., ACK or NACK). In addition, the configuration information on the sequence set may indicate sub-sequence(s) assigned to each receiving terminal and/or terminal group (e.g., group including one or more receiving terminals). The configuration information on the sequence set may indicate at least one of Tables 3 to 10.

The sequence set may be configured for each resource pool (e.g., sidelink resource pool). For example, the sequence set may be configured as shown in Table 14 below. One or more sequence sets may be mapped to one resource pool. Alternatively, one sequence set may be mapped to one or more resource pools. The PSFCH configuration information (or sidelink configuration information) may further include mapping information between the resource pool and the sequence set (e.g., mapping information defined in Table 14 below).\

TABLE 14

| Resource pool | Sequence set |
| --- | --- |
| Resource pool #1 | Sequence sets #1 and #2 |
| Resource pool #2 | Sequence set #3 |
| Resource pool #3 | Sequence set #4 |
| Resource pool #4 | Sequence sets #1 and #4 |

In Table 14, one resource pool may be one PSFCH or one feedback resource region. In Table 14, the resource pool may be a region of periodic resources or aperiodic resources. A plurality of sequences belonging to a sequence set may have a specific relationship. The mapping information defined in Table 14 may be indicated by one or a combination of two or more of higher layer signaling, MAC signaling, and PHY signaling. In the resource pool configuration step, the terminal (e.g., transmitting terminal or receiving terminal) may identify the sequence set(s) to be used by itself. Configuration information on the resource pool may be indicated by one or a combination of two or more of higher layer signaling, MAC signaling, and PHY signaling.

In another exemplary embodiment, sequence sets may be configured as shown in Table 15 below. A sequence set for each of ACK and NACK may be configured in each resource pool. One or more sequence sets may be mapped to one ACK, and one or more sequence sets may be mapped to one NACK. The mapping information defined in Table 15 may be indicated by one or a combination of two or more of higher layer signaling, MAC signaling, and PHY signaling. In addition, the mapping information defined in Table 15 may be indicated by an explicit scheme, an implicit scheme, or a combination of an explicit scheme and an implicit scheme.

TABLE 15

| | Sequence set | |
| --- | --- | --- |
| Resource pool | ACK | NACK |
| Resource pool #1 | Sequence set #1 | Sequence set #2 |
| Resource pool #2 | Sequence sets #1 and #2 | Sequence sets #3 and #4 |
| Resource pool #3 | Sequence set #3 | Sequence set #4 |
| Resource pool #4 | Sequence sets #1 and #4 | Sequence set #2 |

Meanwhile, the transmitting terminal and/or the receiving terminal(s) may receive a higher layer message from the base station, and may identify sidelink configuration information (e.g., PSFCH configuration information) included in the higher layer message. The PSFCH configuration information may include one or more information elements listed in Tables 11 to 15. The transmitting terminal and/or the receiving terminal(s) may perform sidelink communication (e.g., sidelink-groupcast communication) using the sidelink configuration information.

For example, the transmitting terminal may generate SCI (e.g., 1st-stage SCI and/or 2nd-stage SCI) including scheduling information for transmission of sidelink data, and transmit the SCI to receiving terminal(s) or a terminal group (S1602). The terminal group may include one or more receiving terminals. One or more receiving terminals included in the terminal group may be receiving terminal(s) paired with the transmitting terminal. For example, one or more receiving terminals multiplexing HARQ responses in the same PSFCH (e.g., the same feedback resource region) may be configured as one terminal group. One or more receiving terminals having a reception quality (e.g., reference signal received power (RSRP), reference signal received quality (RSRQ), reference signal strength indicator (RSSI)) belonging to a preset range (e.g., similar or different range) among a plurality of receiving terminals may be configured to belong to the same terminal group.

Alternatively, the terminal group may be configured according to a distance between the transmitting terminal and the receiving terminal. For example, when the distance between the transmitting terminal and one or more receiving terminals is less than or equal to a threshold, the one or more receiving terminals may be configured to belong to the same terminal group. In another exemplary embodiment, when the distance between the transmitting terminal and one or more receiving terminals exceeds a threshold, the one or more receiving terminals may be configured to belong to the same terminal group.

The SCI may be transmitted on a PSCCH and/or PSSCH. The SCI may be a common SCI transmitted to all receiving terminals participating in sidelink-groupcast communication. Alternatively, the SCI may be a terminal-specific SCI transmitted to each of the receiving terminals participating in sidelink-groupcast communication. Alternatively, the SCI may be a group-specific SCI transmitted to each of terminal groups participating in sidelink-groupcast communication.

The SCI may further include PSFCH resource information for HARQ feedback transmission for sidelink data as well as the scheduling information. For example, the SCI may further include one or more information elements listed in Table 16 below. Alternatively, one or more information elements listed in Table 16 below may be indicated by MAC signaling or a combination of MAC signaling and PHY signaling. One or more information elements listed in Table 16 below may be indicated in association with higher layer signaling. One or more information elements listed in Table 16 below may be indicated implicitly or explicitly.

PSSCH indicated by the SCI to obtain the sidelink data. The receiving terminal(s) may transmit HARQ response(s) to the transmitting terminal based on result(s) of receiving the sidelink data (S1604). The sub-sequence(s) mapped to the HARQ response(s) in the step S1604 may be transmitted on a PSFCH (e.g., feedback resource region).

When the number of receiving terminals participating in sidelink communication (e.g., sidelink-groupcast communication) is equal to or greater than a threshold, a plurality of PSFCHs (e.g., PSFCHs #1 and #2) may be used. Here, the threshold may indicate the maximum number of receiving terminals supportable in one PSFCH. In this case, among a plurality of receiving terminals participating in sidelink communication, some receiving terminals may transmit HARQ responses (e.g., sub-sequences) to the transmitting terminal on the PSFCH #1, and the remaining receiving terminals may transmit the HARQ responses (e.g., sub-sequences) on the PSFCH #2.

The plurality of sub-sequences may be multiplexed in the same PSFCH or the same feedback resource region. The plurality of sub-sequences multiplexed in the same PSFCH or the same feedback resource region may be a plurality of sub-sequences generated by the receiving terminals belonging to the same terminal group. For example, the sub-sequence(s) may be transmitted based on at least one of the schemes shown in FIGS. 8 to 12.

TABLE 16

| Information element | Description |
| --- | --- |
| PSFCH1-UE-id | PSFCH1-UE-id may be information (e.g., terminal IDs, terminal indexes, terminal group ID, terminal group index) indicating terminals or a terminal group using a PSFCH #1 when a plurality of PSFCHs are configured. |
| PSFCH2-UE-id | PSFCH2-UE-id may be information (e.g., terminal IDs, terminal indexes, terminal group ID, terminal group index) indicating terminals or a terminal group using a PSFCH #2 when a plurality of PSFCHs are configured. |
| Feedback1-UE-id | Feedback1-UE-id may be information (e.g., terminal IDs, terminal indexes, terminal group ID, terminal group index) indicating terminals or a terminal group using a feedback resource region #1 when one PSFCH includes a plurality of feedback resource regions. |
| Feedback2-UE-id | Feedback2-UE-id may be information (e.g., terminal IDs, terminal indexes, terminal group ID, terminal group index) indicating terminals or a terminal group using a feedback resource region #2 when one PSFCH includes a plurality of feedback resource regions. |
| HARQ-indicator | HARQ-indicator may indicate a HARQ feedback scheme used for sidelink communication. |
| HARQ-toggle | HARQ-toggle may indicate whether a HARQ feedback scheme used for sidelink communication is changed. |
| SequenceSet-indicator | SequenceSet-indicator may indicate a sequence set allocated to terminals or a terminal group. When SequenceSet-indicator is not present, the terminals may generate sequences according to a rule (e.g., equation) that the terminals know, and the generated sequences may be orthogonal to each other. |
| Subsequence-indicator | Subsequence-indicator may indicate sub-sequence(s) allocated to terminals or a terminal group. When Subsequence-indicator is not present, the terminals may generate sub-sequences according to a rule (e.g., equation) that the terminals know, and the generated sub-sequences may be orthogonal to each other. |

The receiving terminal(s) may receive the SCI from the transmitting terminal, and may identify information element(s) included in the SCI. The transmitting terminal may transmit sidelink data on a PSSCH indicated by the SCI (S1603). The sidelink data may be transmitted to one or more receiving terminals in a groupcast scheme. The receiving terminal(s) may perform a monitoring operation on the In addition, in the step S1604, the sub-sequence(s) may be transmitted together with the reference signal(s). The reference signal(s) may be mapped to the remaining REs to which the sub-sequence(s) are not mapped among the REs constituting the PSFCH (or feedback resource region). Alternatively, the reference signal(s) may be mapped to REs that do not belong to the PSFCH (or feedback resource region) on which the sub-sequence(s) are transmitted. For example, the receiving terminal(s) may transmit the reference signal(s) according to at least one of the schemes shown in FIGS. 13 to 15.

The transmitting terminal may receive the reference signal(s) from the receiving terminal(s), and may estimate the channel(s) based on the reference signal(s). The transmitting terminal may detect the sub-sequence(s) of the receiving terminal(s) based on the results of the channel estimation. Alternatively, when the reference signal(s) is not used, the transmitting terminal may detect the sub-sequence(s) of the receiving terminal(s) without channel estimation based on the reference signal(s).

For example, the transmitting terminal may detect a sequence by performing a monitoring operation on the PSFCH or the feedback resource region, and may identify sub-sequences constituting the sequence. In the case A shown in FIG. 8, the transmitting terminal may detect the sub-sequences #1 and #2 from the sequence received from the receiving terminals. In this case, the transmitting terminal may determine that decoding of the data in the receiving terminal #1 is successful, and may determine that the decoding of the data in the receiving terminal #2 is successful. In the case B shown in FIG. 9 when the ACK-only feedback scheme is used, the transmitting terminal may detect the sub-sequence #1 from the sequence received from the receiving terminals. In this case, the transmitting terminal may determine that decoding of the data in the receiving terminal #1 is successful, and may determine that the decoding of the data in the receiving terminal #2 has failed.

In the case C shown in FIG. 10, the transmitting terminal may detect the sub-sequences #1 and #2 from the sequence received from the receiving terminal. When the sub-sequence #1 is detected in the feedback resource region configured for the receiving terminal #2, the transmitting terminal may determine that decoding of the data in the receiving terminal #2 is successful. When the sub-sequence #2 is detected in the feedback resource region configured for the receiving terminal #1, the transmitting terminal may determine that decoding of data in the receiving terminal #1 has failed. In the case D shown in FIG. 11A, the transmitting terminal may detect the sub-sequences #1, #4, and #5 from the sequence received from the receiving terminal. In this case, the transmitting terminal may determine that decoding of the data in the receiving terminal #1 is successful, may determine that the decoding of the data in the receiving terminal #2 has failed, and may determine that the decoding of the data in the receiving terminal #3 is successful. In the case E shown in FIG. 12B when the NACK-only feedback scheme is used, the transmitting terminal may detect the sub-sequence #1 from the sequence received from the receiving terminals. In this case, the transmitting terminal may determine that decoding of the data in the receiving terminal #1 has failed, and may determine that the decoding of the data in the receiving terminals #2 and #3 is successful.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a transmitting terminal in a communication system supporting sidelink communication, the operation method comprising:
    receiving, from a base station, a higher layer signaling message including physical sidelink feedback channel (PSFCH) configuration information;
    transmitting, to a plurality of receiving terminals, sidelink control information (SCI) including resource allocation information of data and configuration information for hybrid automatic repeat request (HARQ) feedback for the data;
    transmitting, to the plurality of receiving terminals, the data on a physical sidelink shared channel (PSSCH) indicated by the SCI; and
    receiving, from the plurality of receiving terminals, sequences mapped to HARQ responses for the data on a PSFCH indicated by the PSFCH configuration information,
    wherein the sequences include a first sequence mapped to a first HARQ response of a first receiving terminal among the plurality of receiving terminals and a second sequence mapped to a second HARQ response of a second receiving terminal among the plurality of receiving terminals; and
    wherein the configuration information for the HARQ feedback includes a HARQ-indicator indicating that an acknowledgement (ACK)/negative ACK (NACK) feedback scheme or a NACK-only feedback scheme is used.

2. The operation method according to claim 1, wherein the first sequence is detected in a first feedback resource region included in the PSFCH, the second sequence is detected in a second feedback resource region included in the PSFCH, and the first feedback resource region is orthogonal to the second feedback resource region.

3. The operation method according to claim 1, wherein a sequence set including the first sequence and the second sequence is configured for each resource pool, and configuration information of the sequence set is included in the PSFCH configuration information.

4. The operation method according to claim 3, wherein the sequence set includes a sequence configured for each of a plurality of receiving terminals or a sequence configured for each of ACK and NACK.

5. The operation method according to claim 1, further comprising receiving reference signals from the plurality of receiving terminals, wherein the receiving of the sequences is performed according to channel estimation results based on the reference signals.

6. The operation method according to claim 5, wherein when a symbol in which the reference signals are located is same as a symbol in which the sequences are located, the reference signals are multiplexed with the sequence in frequency domain.

7. The operation method according to claim 1, wherein the plurality of receiving terminals are receiving terminals having a reception quality within a preset range or receiving terminals having a distance from the transmitting terminal within a threshold among all receiving terminals participating in the sidelink communication.

8. An operation method of a first receiving terminal in a communication system supporting sidelink communication, the operation method comprising:
receiving, from a base station, a higher layer signaling message including physical sidelink feedback channel (PSFCH) configuration information;
receiving, from a transmitting terminal, sidelink control information (SCI) including resource allocation information of data and configuration information for hybrid automatic repeat request (HARQ) feedback for the data;
performing a monitoring operation on a physical sidelink shared channel (PSSCH) indicated by the SCI to receive the data from the transmitting terminal; and
transmitting, to the transmitting terminal, a first sub-sequence mapped to a HARQ response for the data and a first reference signal used for detection of the first sub-sequence on a PSFCH indicated by the PSFCH configuration information,
wherein the configuration information for the HARQ feedback includes a HARQ-indicator indicating that an acknowledgment (ACK)/negative ACK (NACK) feedback scheme or a NACK-only feedback scheme is used.

9. The operation method according to claim 8, wherein when a symbol in which the first reference signal is located is same as a symbol in which the first sub-sequence is located, the first reference signal is multiplexed with the first sub-sequence in frequency domain.

10. The operation method according to claim 8, wherein the first sub-sequence is mapped to a first feedback resource region included in the PSFCH, and a second sub-sequence of a second receiving terminal is mapped to a second feedback resource region included in the PSFCH.

11. The operation method according to claim 10, wherein the first reference signal and a second reference signal used for detection of the second sub-sequence are multiplexed in same resource elements (REs).

12. The operation method according to claim 10, wherein a sub-sequence set including the first sub-sequence and the second sub-sequence is configured for each resource pool, and configuration information of the sub-sequence set is included in the PSFCH configuration information.

13. The operation method according to claim 8, wherein the SCI further includes a terminal group identifier indicating a plurality of receiving terminals participating in the sidelink communication, and the plurality of receiving terminals indicated by the terminal group identifier have a reception quality within a preset range.

14. A transmitting terminal in a communication system supporting sidelink communication, the transmitting terminal comprising:
a processor; and
a memory storing one or more instructions executable by the processor,
wherein the one or more instructions are executed to:
receive, from a base station, a higher layer signaling message including physical sidelink feedback channel (PSFCH) configuration information;
transmit, to a plurality of receiving terminals, sidelink control information (SCI) including resource allocation information of data and configuration information for hybrid automatic repeat request (HARQ) feedback for the data;
transmit, to a plurality of receiving terminals, data on a physical sidelink shared channel (PSSCH) indicated by the SCI; and
receive, from the plurality of receiving terminals, sequences mapped to HARQ responses for the data on a PSFCH indicated by the PSFCH configuration information;
wherein the sequences include a first sequence mapped to a first HARQ response of a first receiving terminal among the plurality of receiving terminals and a second sequence mapped to a second HARQ response of a second receiving terminal among the plurality of receiving terminals, and
wherein the configuration information for the HARQ feedback includes a HARQ-indicator indicating that an acknowledgement (ACK)/negative ACK (NACK) feedback scheme or a NACK-only feedback scheme is used.

15. The transmitting terminal according to claim 14, wherein the first sequence is detected in a first feedback resource region included in the PSFCH, the second sequence is detected in a second feedback resource region included in the PSFCH, and the first feedback resource region is orthogonal to the second feedback resource region.

16. The transmitting terminal according to claim 14, wherein a sequence set including the first sequence and the second sequence is configured for each resource pool, and configuration information of the sequence set is included in the PSFCH configuration information.

17. The transmitting terminal according to claim 14, wherein the sequence set includes a sequence configured for each of a plurality of receiving terminals or a sequence configured for each of ACK and NACK.

18. The transmitting terminal according to claim 14, wherein the one or more instructions are further executed to receive reference signals from the plurality of receiving terminals, wherein the receiving of the sequences is performed according to channel estimation results based on the reference signals.

19. The transmitting terminal according to claim 18, wherein when a symbol in which the reference signals are located is same as a symbol in which the sequences are located, the reference signals are multiplexed with the sequence in frequency domain.

* * * * *